United States Patent
Simms et al.

(10) Patent No.: US 12,168,403 B2
(45) Date of Patent: Dec. 17, 2024

(54) ELECTRICALLY POWERED SLIDE RAIL AND VEHICLE SEAT PROVIDED WITH ELECTRICALLY POWERED SLIDE RAIL

(71) Applicant: TS TECH CO., LTD., Asaka (JP)

(72) Inventors: Andrew J. Simms, Reynoldsburg, OH (US); Dean C. Vandenheede, Reynoldsburg, OH (US)

(73) Assignee: TS TECH CO., LTD., Asaka (JP)

( * ) Notice: Subject to any disclaimer, the term of this patent is extended or adjusted under 35 U.S.C. 154(b) by 358 days.

(21) Appl. No.: 17/702,964

(22) Filed: Mar. 24, 2022

(65) Prior Publication Data

US 2022/0212570 A1   Jul. 7, 2022

Related U.S. Application Data

(63) Continuation of application No. 17/420,518, filed as application No. PCT/JP2019/051180 on Dec. 26, 2019, now Pat. No. 12,017,561.

(Continued)

(51) Int. Cl.
*B60N 2/06*   (2006.01)
*B60N 2/07*   (2006.01)

(52) U.S. Cl.
CPC ........... *B60N 2/067* (2013.01); *B60N 2/0705* (2013.01)

(58) Field of Classification Search
CPC .. B60N 2/067; B60N 2/0705; B60N 2/02253; B60N 2/0264; B60N 2/07; B60N 2/06
See application file for complete search history.

(56) References Cited

U.S. PATENT DOCUMENTS 5,447,352 A  *  9/1995  Ito ........................... B60N 2/075
                                                                    296/65.14
6,971,620 B2 * 12/2005  Moradell ............... B60N 2/067
                                                                    248/424

(Continued)

FOREIGN PATENT DOCUMENTS

DE         202005013714         12/2005
EP         1710118 A2 * 10/2006 ............. B60N 2/067

(Continued)

OTHER PUBLICATIONS

PCT International Search Report for corresponding Application No. PCT/JP2019/051180, mailed on Mar. 3, 2020—2 pages.

(Continued)

*Primary Examiner* — Lori Lyjak
(74) *Attorney, Agent, or Firm* — Dority & Manning, P.A.

(57) ABSTRACT

Provided is an electrically powered slide rail that can operate in a smooth manner. The electrically powered slide rail includes a rail having a channel-shaped cross section and extending in a fore and aft direction, a slider received by the rail and slidably engaged by the rail, a screw assembly including a screw member supported by the slider so as to be rotatable around an axial line extending in the fore and aft direction, an electric motor supported by the slider and configured to rotate the screw member, and a screw engaging portion formed in the rail so as to extend in the fore and aft direction and engage the screw member. In the vehicle seat fitted with the electrically powered slide rail, the rail is connected to a floor of a vehicle, and the slider is connected to a seat cushion.

18 Claims, 14 Drawing Sheets

Related U.S. Application Data

(60) Provisional application No. 62/787,913, filed on Jan. 3, 2019, provisional application No. 62/787,908, filed on Jan. 3, 2019.

(56) References Cited

U.S. PATENT DOCUMENTS

| | | | |
|---|---|---|---|
| 7,104,584 B2 * | 9/2006 | Moriyama | B60N 2/072 296/65.14 |
| 2003/0052246 A1 | 3/2003 | Hoshihara et al. | |
| 2006/0226674 A1 | 10/2006 | Ito et al. | |

FOREIGN PATENT DOCUMENTS

| | | | | |
|---|---|---|---|---|
| JP | H04310437 A | | 11/1992 | |
| JP | H0741120 U | | 7/1995 | |
| JP | H10217810 A | | 8/1998 | |
| JP | 2003 063285 | | 3/2003 | |
| JP | 2003063284 A | | 3/2003 | |
| JP | 2003065419 A | * | 3/2003 | ........... B60N 2/0232 |
| JP | 2005 313662 | | 11/2005 | |

OTHER PUBLICATIONS

US Non-Final Office Action for Corresponding U.S. Appl. No. 17/420,518, dated Nov. 6, 2023, 17 pages.
Extended European Search Report for European Patent Application No. 19907456.8, received on Jul. 15, 2022, 7 pages.
US Office Action for corresponding U.S. Appl. No. 17/702,867, dated May 10, 2024, 12 pages.

* cited by examiner

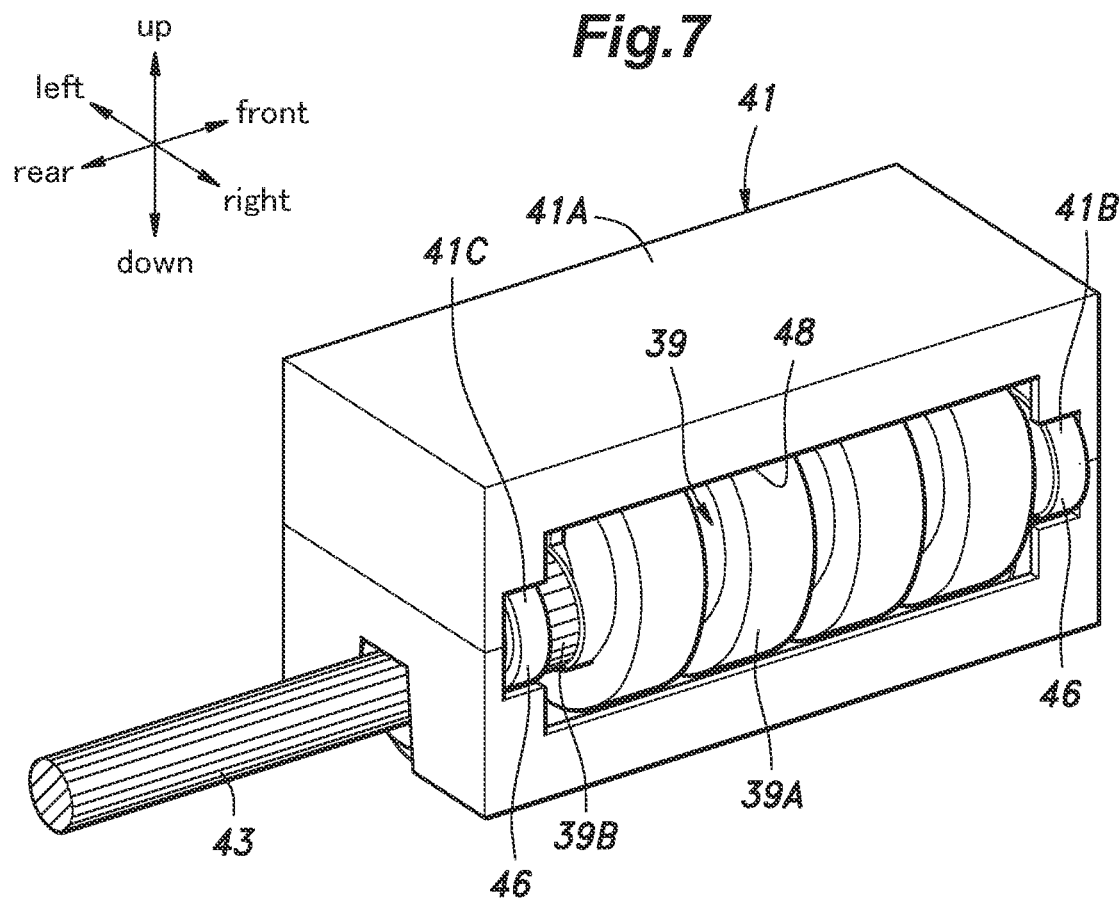

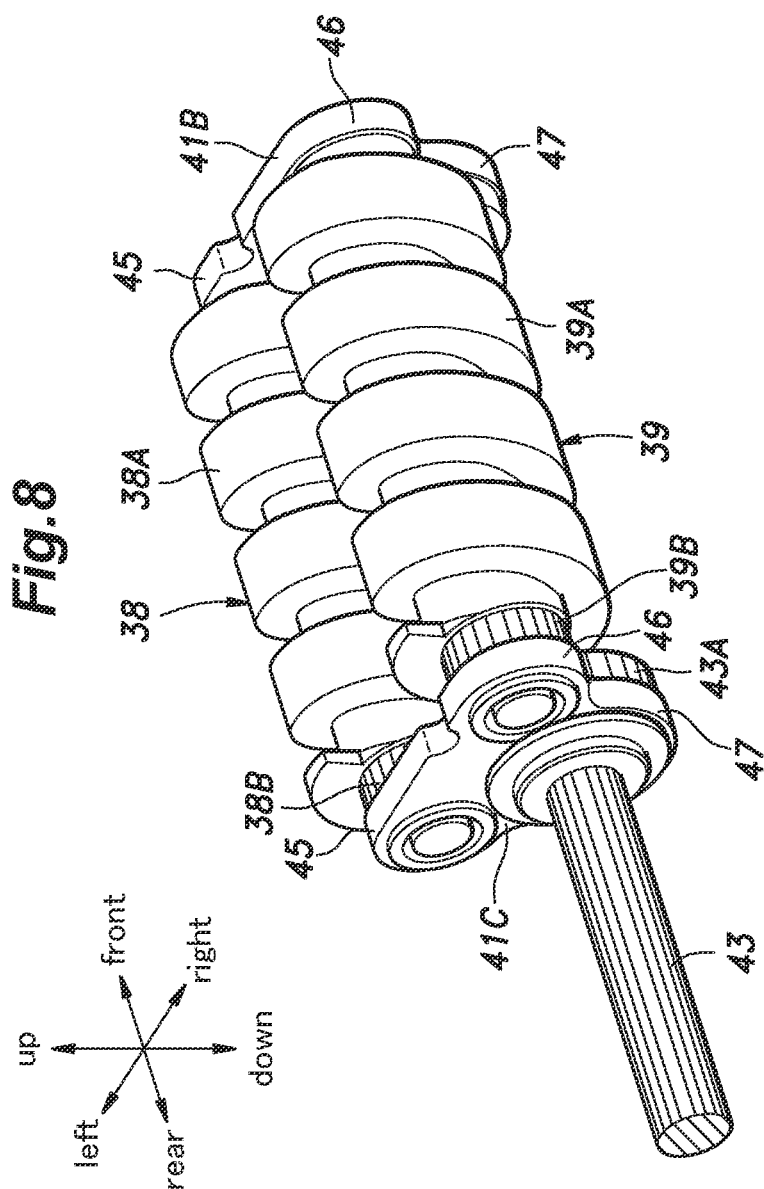

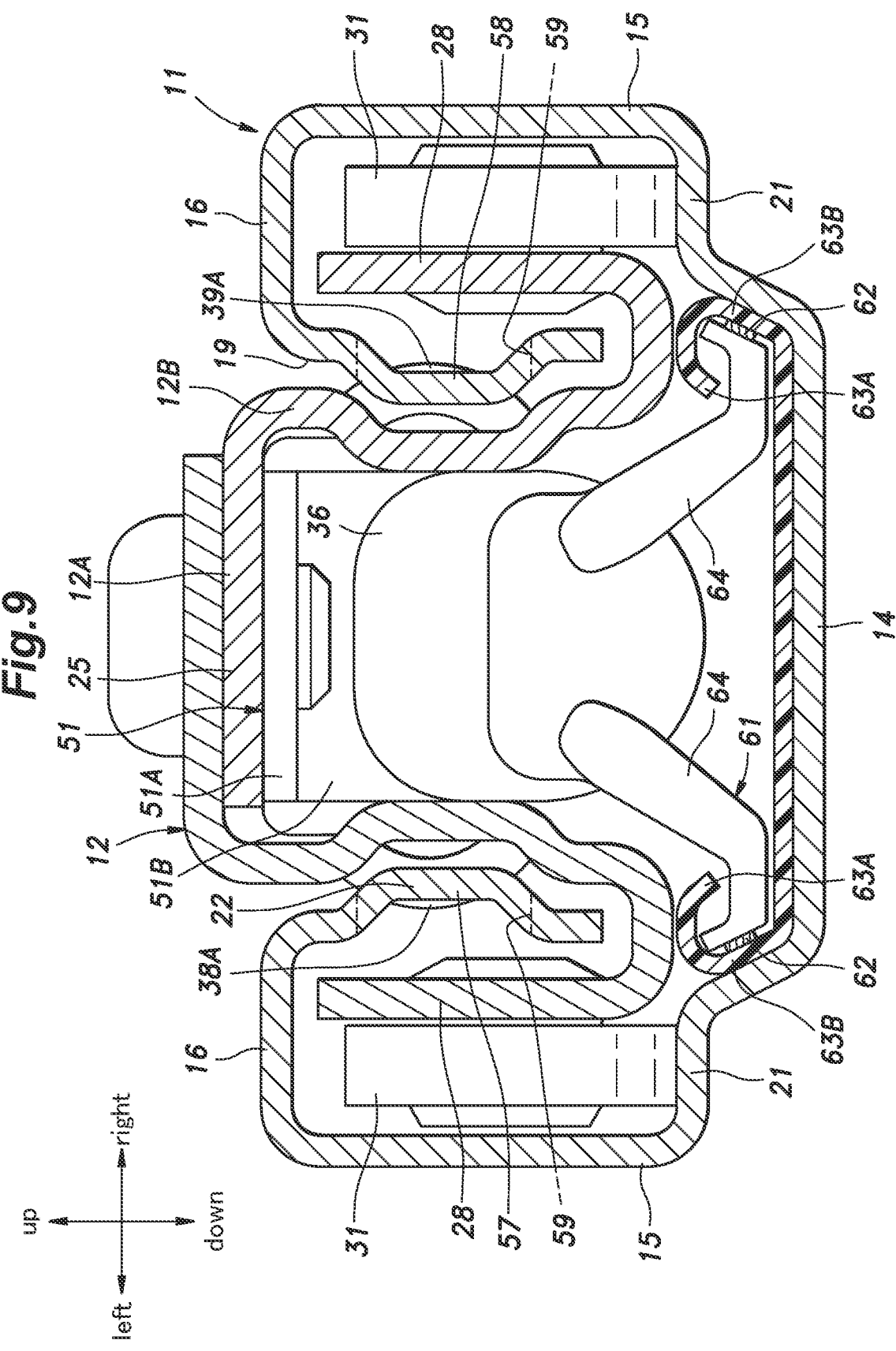

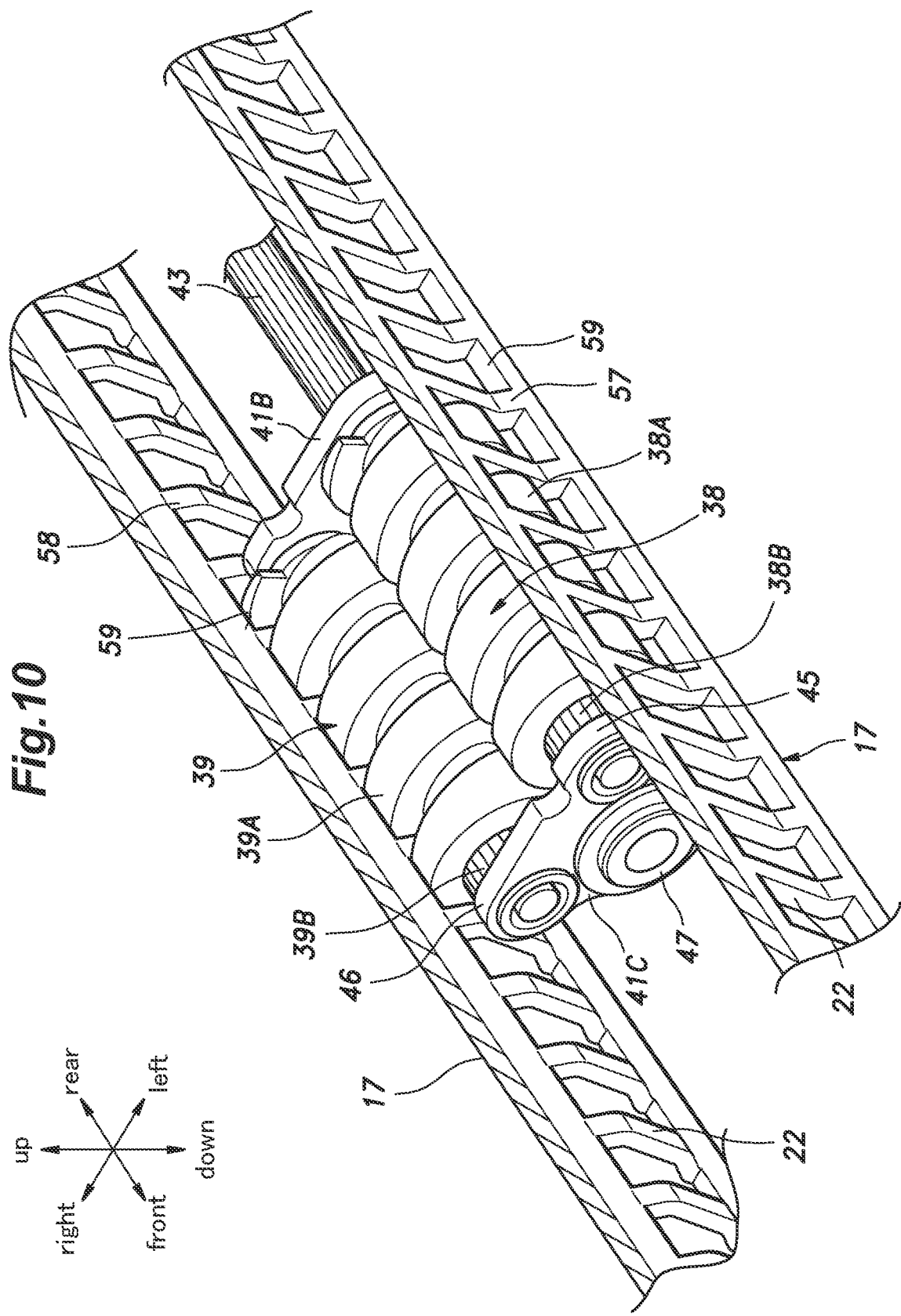

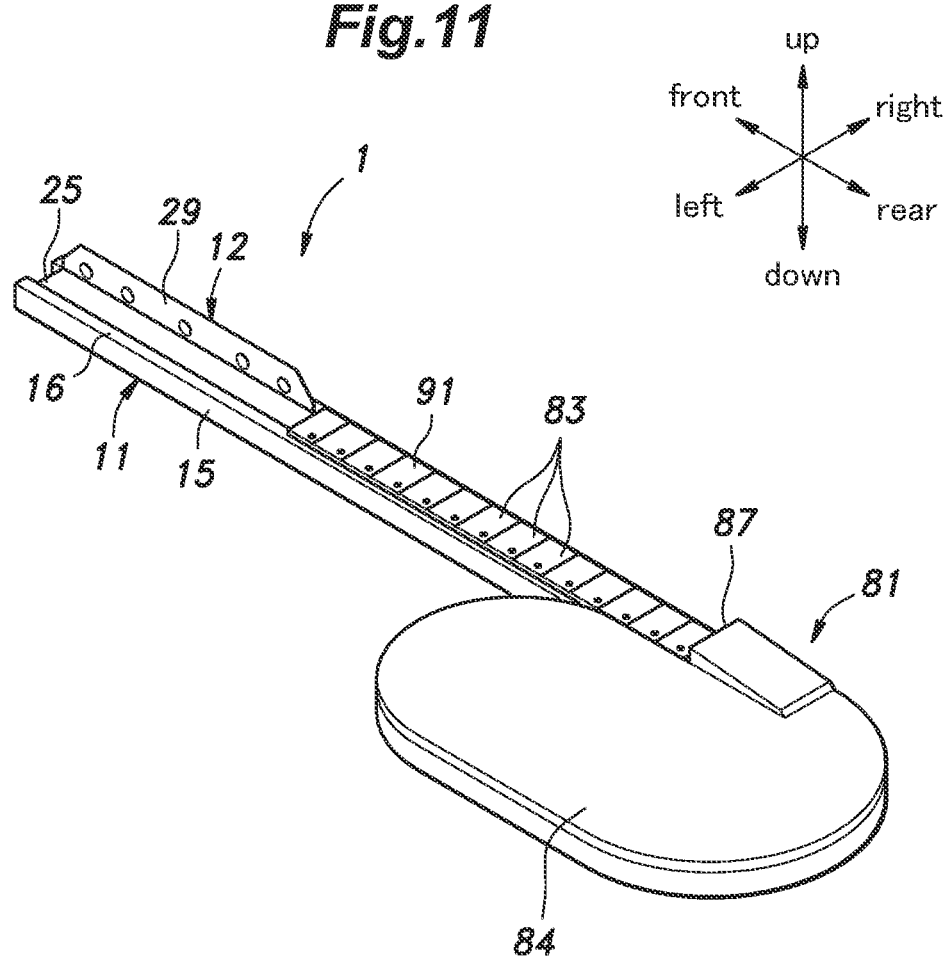

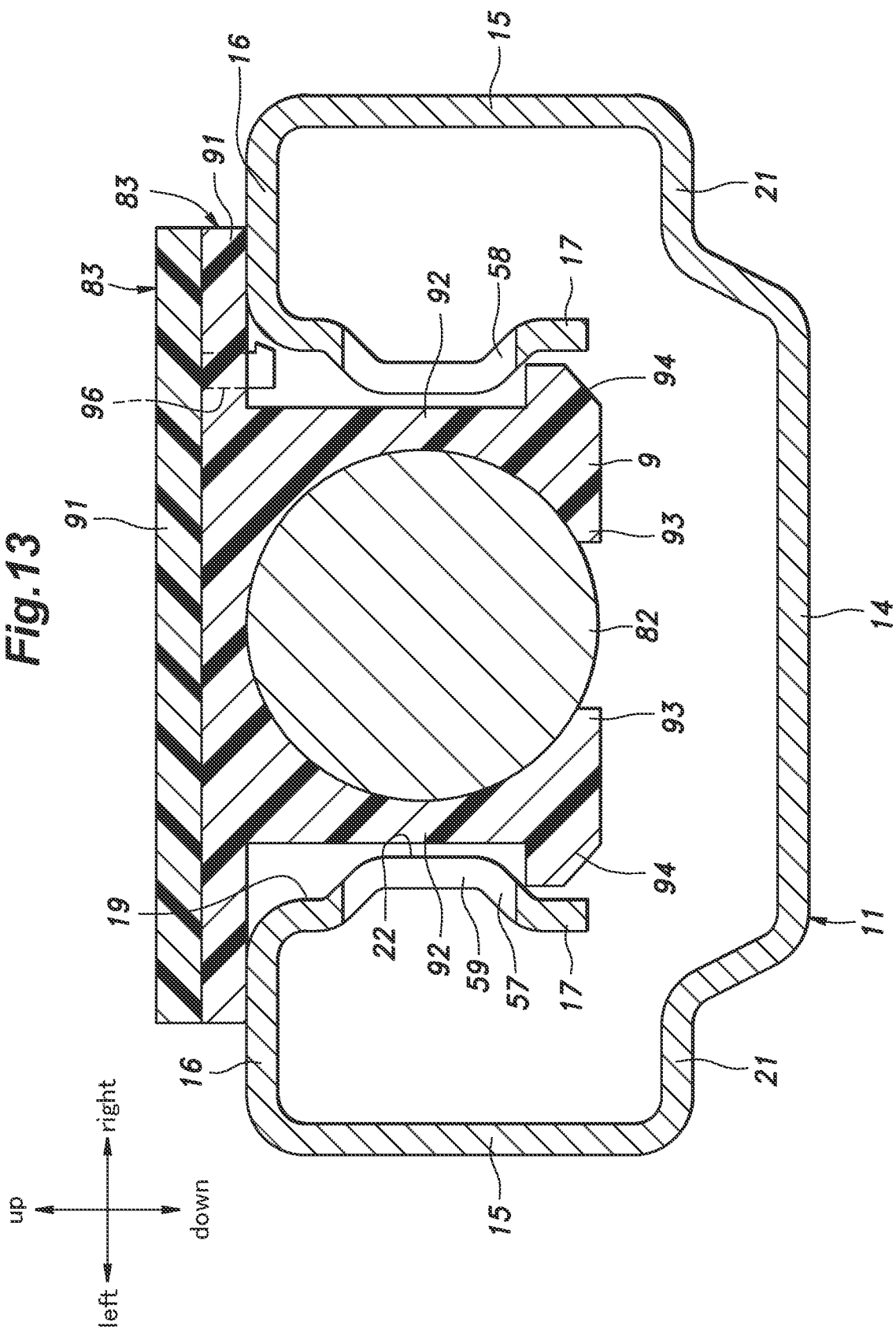

ELECTRICALLY POWERED SLIDE RAIL AND VEHICLE SEAT PROVIDED WITH ELECTRICALLY POWERED SLIDE RAIL

CROSS REFERENCE TO RELATED APPLICATIONS

This application is a continuation of U.S. patent application Ser. No. 17/420,518 filed on Jul. 2, 2021, which is the U.S. National Stage entry of International Application No. PCT/JP2019/051180 filed under the Patent Cooperation Treaty on Dec. 26, 2019, which claims priority to U.S. Provisional Patent Application No. 62/787,913 having a filing date of Jan. 3, 2019 and U.S. Provisional Patent Application No. 62/787,908 having a filing date of Jan. 3, 2019, all of which are incorporated herein by reference.

TECHNICAL FIELD

The present invention relates to an electrically powered slide rail and a vehicle seat provided with an electrically powered slide rail.

BACKGROUND ART

Known is an electrically powered slide rail for an automobile that includes a lower rail, an upper rail, worms interposed between the lower rail and the upper rail and configured to be actuated by an electric motor, and a worm meshing means provided on both the upper rail and the lower rail to threadably engage the worms. See Patent Document 1, for example. There are four worms; two of them on the upper side engage grooves arranged at a prescribed pitch on the lower surface of the upper rail while the remaining two on the lower side engage similar grooves provided on the lower rail.

PRIOR ART DOCUMENT(S)

Patent Document(s)

Patent Document 1: JPH04-310437

SUMMARY OF THE INVENTION

Task to be Accomplished by the Invention

However, if the worms and the electric motor are not fixed to either the lower rail or the upper rail, the worms tend to tilt with respect to the lower rail and the upper rail with the result that the rotation of the worms may be hindered. As a result, the operation of the electrically powered slide rail may be hindered. In addition, owing to such hindrance to the operation of the electrically powered slide rail, abnormal noise and rattling are likely to occur.

In view of such a problem of the prior art, a primary object of the present invention is to provide an electrically powered slide rail that can operate smoothly. Another object of the present invention is to provide a vehicle seat that is capable of a smooth sliding movement.

Means to Accomplish the Task

To achieve such an object, an aspect of the present invention provides an electrically powered slide rail (1), comprising: a rail (11) having a channel-shaped cross section and extending in a fore and aft direction; a slider (12) received by the rail and slidably engaged by the rail; a screw assembly (35) including a screw member (38, 39) supported by the slider so as to be rotatable around an axial line extending in the fore and aft direction; an electric motor (36) supported by the slider and configured to rotate the screw member; and a screw engaging portion (57, 58) formed in the rail so as to extend in the fore and aft direction and engage the screw member.

According to this aspect of the present invention, since the motor and the screw assembly are fixed to the slider, the screw member is prevented from tilting with respect to the screw engaging portion. Therefore, the screw member can be engaged with the screw engaging portion at an appropriate angle, and the screw member can rotate smoothly. As a result, it is possible to provide an electrically powered slide rail that can operate smoothly. Further, since the electric motor is attached to the slider received by the rail, the outer profile of the electric rail device can be minimized in size. The shaft for transmitting the rotational force of the electric motor to the screw member can be shortened. Further, since the screw member rotatably supported by the slider threads with the screw engaging portion provided on the rail, the play (tolerance) can be reduced as compared with the configuration where the screw engaging portions are provided on both the slider and the rail, and the screw members thread with the screw engaging portions provided on both the slider and the rail. Further, since the electric motor and the screw assembly are provided on the slider, the moving stroke of the slider can be easily extended by extending the length the rail.

Preferably, in this configuration, the rail is provided with a first side wall (17) and a second side wall (17) opposing each other, the screw engaging portion includes a first screw engaging portion (57) formed on the first side wall, and a second screw engaging portion (58) formed on the second side wall, and the screw member includes a first screw member (38) that engages with the first screw engaging portion and a second screw member (39) that engages with the second screw engaging portion, the first screw member and the second screw member being arranged parallel to each other between the first screw engaging portion and the second screw engaging portion.

According to this aspect of the present invention, since the screw assembly includes both the first screw member and the second screw member, the screw assembly can be made small in size although engaging with both the first screw engaging portion and the second screw engaging portion. Further, since the direction of the reaction force received by the first screw member from the first screw engaging portion and the direction of the reaction force received by the second screw member from the second screw engaging portion are opposite to each other, the first screw member and the first screw engaging portion can be reliably engaged with each other, and the second screw member and the second screw engaging portion can be reliably engaged with each other. Further, since the first screw engaging portion and the second screw engaging portion are formed, respectively, on the first side wall and the second side wall opposing each other, foreign matter is prevented from depositing in the first screw engaging portion and the second screw engaging portion.

Preferably, in this configuration, the screw assembly includes a gear case (41) that rotatably supports the first screw member and the second screw member, and a first bracket (42) that supports the gear case on the slider, the gear case having an opening (48) that laterally exposes the first screw member and the second screw member.

Thereby, the assembling the screw assembly having the first screw member and the second screw member to the slider can be facilitated.

Preferably, in this configuration, the first bracket is provided with a first connecting portion (42A) extending forward from a front part of the gear case and a second connecting portion (42B) extending rearward from a rear part of the gear case, the first bracket being connected to the slider at the first connecting portion and the second connecting portion.

Thereby, the first bracket can support the first gear case in a stable manner.

Preferably, in this configuration, the first bracket is formed by a single-piece metallic member including a support portion (42C) extending from the first connecting portion to the second connecting portion, the gear case being positioned between the slider and the support portion.

Thus, the closed cross section structure formed by the slider and the first bracket can support the gear case in stable manner.

Preferably, in this configuration, the electrically powered slide rail further comprises a second bracket (51) connected to a part of the slider in front of or behind the first bracket for supporting the electric motor, the second bracket supporting an end of the electric motor on a side of the screw members as a cantilever.

Since the electric motor is supported by the second bracket forming a cantilever, the electric motor can be slightly tilted with respect to the screw assembly. As a result, a small misalignment between the rotary shaft of the electric motor and the screw assembly can be tolerated.

Preferably, in this configuration, the slider is formed in a channel shape by including a base portion (25), and a third side wall (26) and a fourth side wall (26) extending from the base portion toward a bottom portion of the rail, the third side wall opposing the first side wall, the fourth side wall opposing the second side wall, and the second bracket is connected to the base portion while the electric motor is positioned between the third side wall and the fourth side wall.

Thereby, the electric motor can be placed inside the slider so as to reduce the outer profile of the electrically powered slide rail in size.

Preferably, in this configuration, the first screw member passes through an opening (55) formed in the third side wall to engage with the first screw engaging portion, and the second screw member passes through an opening formed in the fourth side wall to engage with the second screw engaging portion.

Thereby, the screw assembly can be placed close to the electric motor. As a result, the shaft that transmits the driving force of the electric motor to the screw assembly can be reduced in length so that the rotation of the screw member can be performed in a smooth manner.

Preferably, in this configuration, the gear case is provided with a pair of first bearing portions (45) arranged along the fore and aft direction to rotatably support a front end and a rear end of the first screw member, a pair of second bearing portions (46) arranged along the fore and aft direction to rotatably support a front end and a rear end of the second screw member, and a pair of third bearing portions (47) arranged along the fore and aft direction to rotatably support a drive shaft (43) connected to a rotary shaft (36A) of the electric motor. Further, the drive shaft is provided with a pair of drive gears (43A) arranged along the fore and aft direction, the first screw member is provided with a pair of first gears (38B) arranged along the fore and aft direction meshing with the corresponding drive gears, and the second screw members is provided with a pair of second gears (39B) arranged along the fore and aft direction meshing with the corresponding drive gears.

According to this aspect of the present invention, the rotational force of the electric motor can be reliably transmitted to the first screw member and the second screw member. Further, the first screw member, the second screw member, and the drive shaft can be arranged in a stable and accurate manner.

Preferably, in this configuration, the rotary shaft of the electric motor is connected to the drive shaft via a speed reduction unit.

Thereby, the rotation of the drive shaft can be reduced in speed so as to generate the torque required for the first screw member and the second screw member.

Preferably, in this configuration, the first side wall and the second side wall are respectively formed with protrusions (22) that protrude toward each other and extend in the fore and aft direction, and the screw engaging portions includes a plurality of engaging holes (59) formed in the protrusions along the fore and aft direction.

Thereby, the screw engaging portion and the teeth of the screw member can be engaged with each other to an increased extent.

Preferably, in this configuration, the rail is internally provided with a conductive strip (62) extending in the fore and aft direction and connected to a power source, and an electrical insulating sheet (63) provided between the rail and the conductive strip, and the electric motor is provided with a conductive contact terminal (64) that is in sliding contact with the conductive strip.

Thereby, the need for a wire harness for supplying electric power to the electric motor can be eliminated.

Preferably, in this configuration, the electrically insulating sheet has an extension (63A) along a side edge thereof, the extension being bent inward above the conductive strip to oppose the conductive strip with a gap defined therebetween, and the contact terminal extends into the gap defined between the extension and the conductive strip.

Thereby, foreign matter is prevented from coming into contact with the conductive strip.

Yet another aspect of the present invention provides a vehicle seat (2) provided with the electrically powered slide rail defined above, wherein the rail is connected to a floor (3) of a vehicle, and the slider is connected to a seat cushion (5).

Thus, the present invention provides a vehicle seat capable of smoothly sliding movement.

Preferably, in this configuration, the rail is received in a rail groove (4) formed in the floor.

Thereby, the rail can be placed in the rail groove so that the rail does not protrude from the floor.

Effect of the Invention

An aspect of the present invention provides an electrically powered slide rail (1), comprising: a rail (11) having a channel-shaped cross section and extending in a fore and aft direction; a slider (12) received by the rail and slidably engaged by the rail; a screw assembly (35) including a screw member (38, 39) supported by the slider so as to be rotatable around an axial line extending in the fore and aft direction; an electric motor (36) supported by the slider and configured to rotate the screw member; and a screw engaging portion (57, 58) formed in the rail so as to extend in the fore and aft direction and engage the screw member.

According to this aspect of the present invention, since the motor and the screw assembly are fixed to the slider, the screw member is prevented from tilting with respect to the screw engaging portion. Therefore, the screw member can be engaged with the screw engaging portion at an appropriate angle, and the screw member can rotate smoothly. As a result, it is possible to provide an electrically powered slide rail that can operate smoothly. Further, since the electric motor is attached to the slider received by the rail, the outer profile of the electric rail device can be minimized in size. The shaft for transmitting the rotational force of the electric motor to the screw member can be shortened. Further, since the screw member rotatably supported by the slider threads with the screw engaging portion provided on the rail, the play (tolerance) can be reduced as compared with the configuration where the screw engaging portions are provided on both the slider and the rail, and the screw members thread with the screw engaging portions provided on both the slider and the rail. Further, since the electric motor and the screw assembly are provided on the slider, the moving stroke of the slider can be easily extended by extending the length the rail.

Preferably, in this configuration, the rail is provided with a first side wall (17) and a second side wall (17) opposing each other, the screw engaging portion includes a first screw engaging portion (57) formed on the first side wall, and a second screw engaging portion (58) formed on the second side wall, and the screw member includes a first screw member (38) that engages with the first screw engaging portion and a second screw member (39) that engages with the second screw engaging portion, the first screw member and the second screw member being arranged parallel to each other between the first screw engaging portion and the second screw engaging portion.

According to this aspect of the present invention, since the screw assembly includes both the first screw member and the second screw member, the screw assembly can be made small in size although engaging with both the first screw engaging portion and the second screw engaging portion. Further, since the direction of the reaction force received by the first screw member from the first screw engaging portion and the direction of the reaction force received by the second screw member from the second screw engaging portion are opposite to each other, the first screw member and the first screw engaging portion can be reliably engaged with each other, and the second screw member and the second screw engaging portion can be reliably engaged with each other. Further, since the first screw engaging portion and the second screw engaging portion are formed, respectively, on the first side wall and the second side wall opposing each other, foreign matter is prevented from depositing in the first screw engaging portion and the second screw engaging portion.

Preferably, in this configuration, the screw assembly includes a gear case (41) that rotatably supports the first screw member and the second screw member, and a first bracket (42) that supports the gear case on the slider, the gear case having an opening (48) that laterally exposes the first screw member and the second screw member.

Thereby, the assembling the screw assembly having the first screw member and the second screw member to the slider can be facilitated.

Preferably, in this configuration, the first bracket is provided with a first connecting portion (42A) extending forward from a front part of the gear case and a second connecting portion (42B) extending rearward from a rear part of the gear case, the first bracket being connected to the slider at the first connecting portion and the second connecting portion.

Thereby, the first bracket can support the first gear case in a stable manner.

Preferably, in this configuration, the first bracket is formed by a single-piece metallic member including a support portion (42C) extending from the first connecting portion to the second connecting portion, the gear case being positioned between the slider and the support portion.

Thus, the closed cross section structure formed by the slider and the first bracket can support the gear case in stable manner.

Preferably, in this configuration, the electrically powered slide rail further comprises a second bracket (51) connected to a part of the slider in front of or behind the first bracket for supporting the electric motor, the second bracket supporting an end of the electric motor on a side of the screw members as a cantilever.

Since the electric motor is supported by the second bracket forming a cantilever, the electric motor can be slightly tilted with respect to the screw assembly. As a result, a small misalignment between the rotary shaft of the electric motor and the screw assembly can be tolerated.

Preferably, in this configuration, the slider is formed in a channel shape by including a base portion (25), and a third side wall (26) and a fourth side wall (26) extending from the base portion toward a bottom portion of the rail, the third side wall opposing the first side wall, the fourth side wall opposing the second side wall, and the second bracket is connected to the base portion while the electric motor is positioned between the third side wall and the fourth side wall.

Thereby, the electric motor can be placed inside the slider so as to reduce the outer profile of the electrically powered slide rail in size.

Preferably, in this configuration, the first screw member passes through an opening (55) formed in the third side wall to engage with the first screw engaging portion, and the second screw member passes through an opening formed in the fourth side wall to engage with the second screw engaging portion.

Thereby, the screw assembly can be placed close to the electric motor. As a result, the shaft that transmits the driving force of the electric motor to the screw assembly can be reduced in length so that the rotation of the screw member can be performed in a smooth manner.

Preferably, in this configuration, the gear case is provided with a pair of first bearing portions (45) arranged along the fore and aft direction to rotatably support a front end and a rear end of the first screw member, a pair of second bearing portions (46) arranged along the fore and aft direction to rotatably support a front end and a rear end of the second screw member, and a pair of third bearing portions (47) arranged along the fore and aft direction to rotatably support a drive shaft (43) connected to a rotary shaft (36A) of the electric motor. Further, the drive shaft is provided with a drive gear (43A), the first screw member is provided with a first gear (38B) meshing with the drive gear, and the second screw members is provided with a second gear (39B) meshing with the drive gear.

According to this aspect of the present invention, the rotational force of the electric motor can be reliably transmitted to the first screw member and the second screw member. Further, the first screw member, the second screw member, and the drive shaft can be arranged in a stable and accurate manner.

Preferably, in this configuration, the rotary shaft of the electric motor is connected to the drive shaft via a speed reduction unit.

Thereby, the rotation of the drive shaft can be reduced in speed so as to generate the torque required for the first screw member and the second screw member.

Preferably, in this configuration, the first side wall and the second side wall are respectively formed with protrusions (22) that protrude toward each other and extend in the fore and aft direction, and the screw engaging portions includes a plurality of engaging holes (59) formed in the protrusions along the fore and aft direction.

Thereby, the screw engaging portion and the teeth of the screw member can be engaged with each other to an increased extent.

Preferably, in this configuration, the rail is internally provided with a conductive strip (62) extending in the fore and aft direction and connected to a power source, and an electrical insulating sheet (63) provided between the rail and the conductive strip, and the electric motor is provided with a conductive contact terminal (64) that is in sliding contact with the conductive strip.

Thereby, the need for a wire harness for supplying electric power to the electric motor can be eliminated.

Preferably, in this configuration, the electrically insulating sheet has an extension (63A) along a side edge thereof, the extension being bent inward above the conductive strip to oppose the conductive strip with a gap defined therebetween, and the contact terminal extends into the gap defined between the extension and the conductive strip.

Thereby, foreign matter is prevented from coming into contact with the conductive strip.

Yet another aspect of the present invention provides a vehicle seat (2) provided with the electrically powered slide rail defined above, wherein the rail is connected to a floor (3) of a vehicle, and the slider is connected to a seat cushion (5).

Thus, the present invention provides a vehicle seat capable of smoothly sliding movement.

Preferably, in this configuration, the rail is received in a rail groove (4) formed in the floor.

Thereby, the rail can be placed in the rail groove so that the rail does not protrude from the floor.

BRIEF DESCRIPTION OF THE DRAWING(S)

FIG. 7 is a perspective view of a screw assembly with a first bracket omitted from illustration;

FIG. 8 is a perspective view of the screw assembly with the first bracket and an outer case omitted from illustration;

FIG. 9 is a sectional view of the electrically powered slide rail (taken along line IX-LX in FIG. 5);

FIG. 10 is a perspective view showing the meshing between a first and a second screw member and a first and a second screw engagement portion:

FIG. 11 is a perspective view of an electrically powered slide rail provided with a power feeding device according to a modified embodiment of the present invention;

FIG. 13 is a sectional view of a cover piece; and

DESCRIPTION OF THE PREFERRED EMBODIMENT(S)

Embodiments of the present invention are described in the following with reference to the appended drawings. The electrically powered slide rail includes a rail and a slider that can slidably move relative to the rail. The rail is connected to a first structure and the slider is connected to a second structure. As the slider moves relative to the rail, the electrically powered slide rail causes the second structure to move relative to the first structure. The electrically powered slide rail is provided, for example, between the floor of a vehicle and the seat to move the seat relative to the floor. Further, the electrically powered slide rail may also be provided between a base and a work holder to move the work holder relative to the base.

Figure 1:
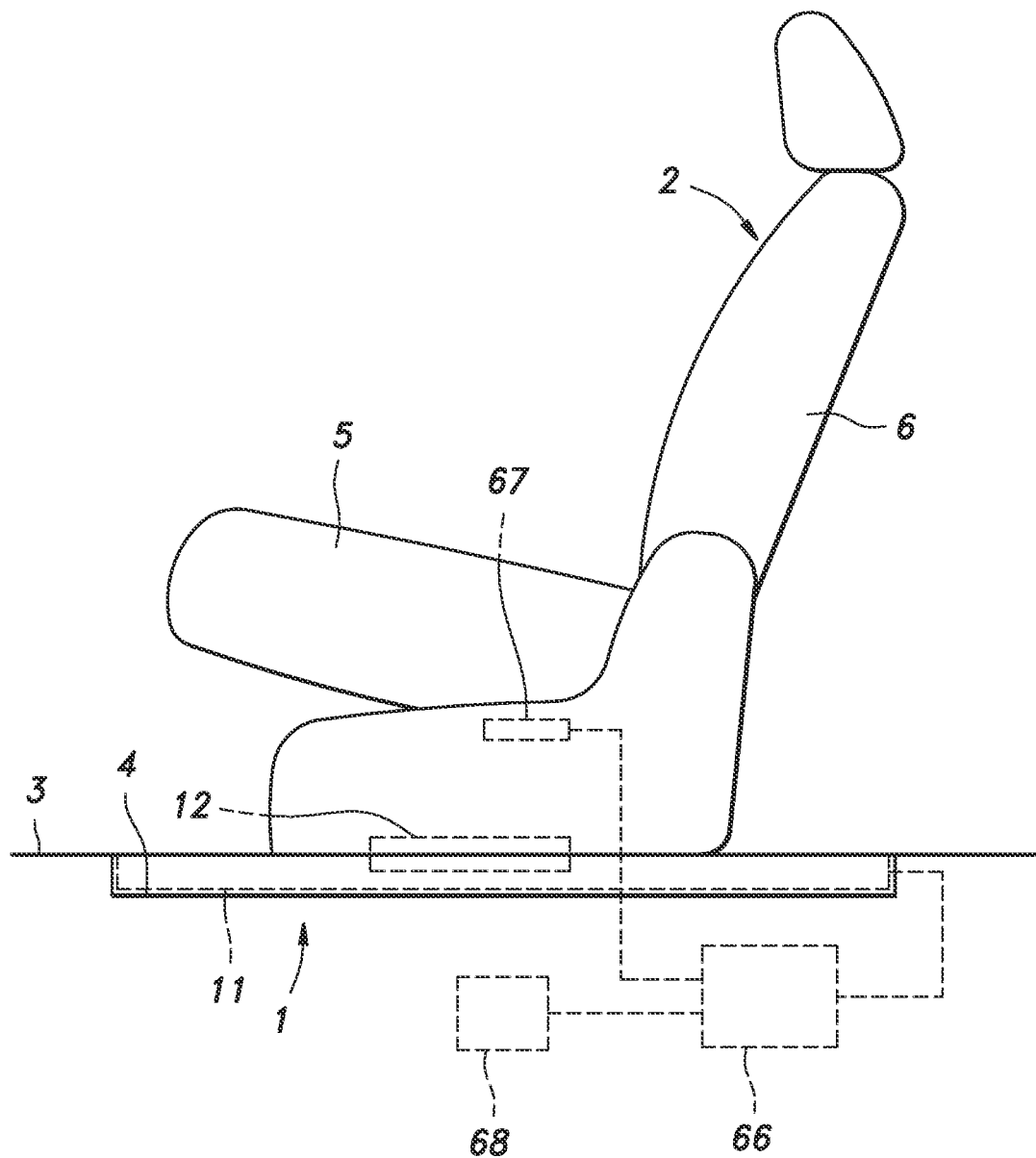
FIG. 1 is a configuration diagram of a vehicle seat provided with an electrically powered slide rail according to an embodiment of the present invention.

An electrically powered slide rail 1 and a vehicle seat 2 fitted with the electrically powered slide rail 1 according to an embodiment of the present invention are described in the following with reference to the appended drawings. As shown in FIG. 1, the vehicle seat 2 is provided with at least one electrically powered slide rail 1 in a lower part thereof, and is connected to the floor 3 of the vehicle via the electrically powered slide rail 1. The vehicle seat 2 includes a seat cushion 5 that supports the buttocks of the occupant, and a seat back 6 that extends upward from a rear part of the seat cushion 5 to support the back of the occupant. The electrically powered slide rail 1 is provided between the floor 3 and the seat cushion 5 to support the seat cushion 5 so as to be slidable with respect to the floor 3. The vehicle seat 2 is preferably provided with a pair of such electrically powered slide rails 1.

Figure 2:
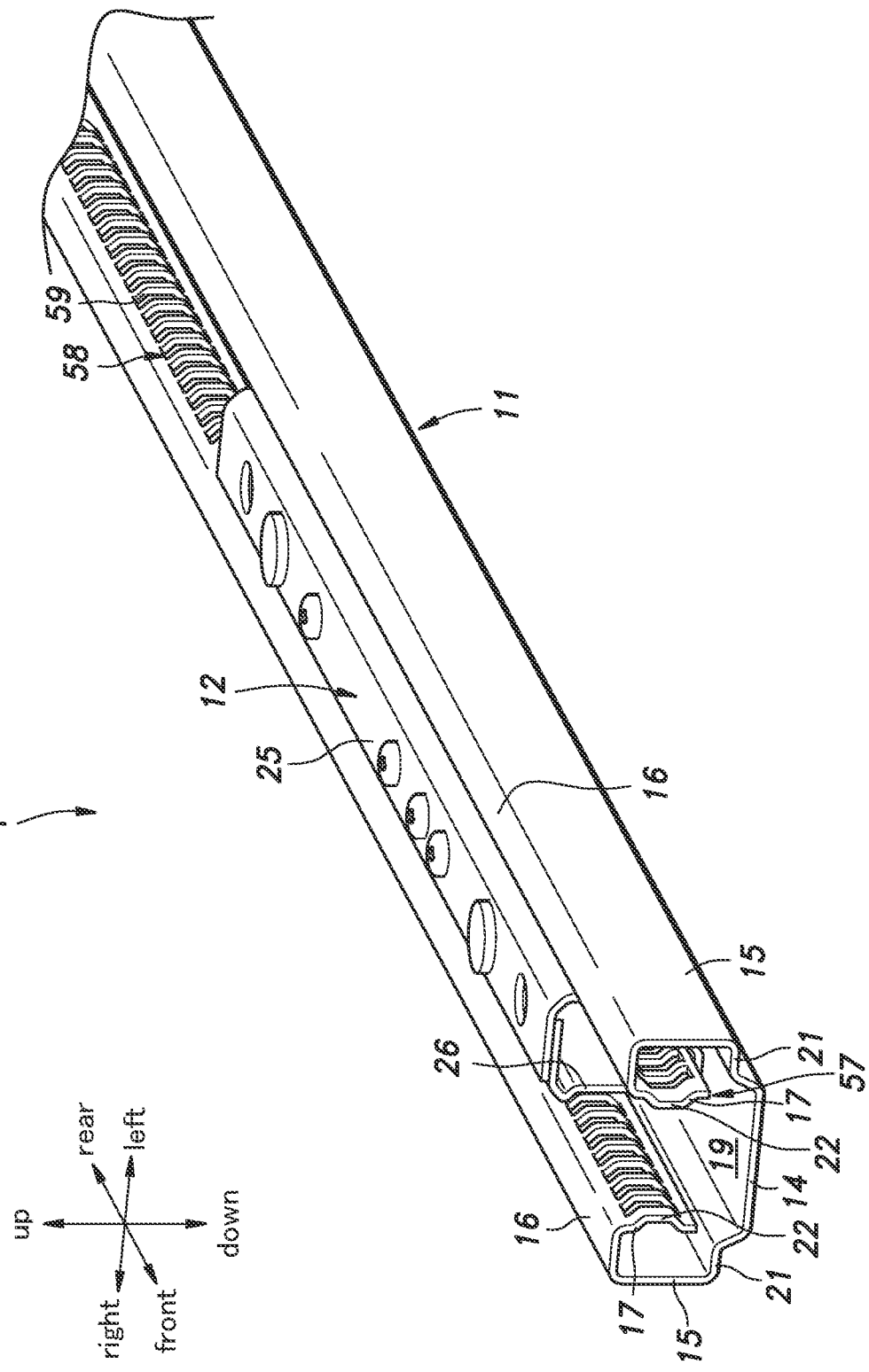
FIG. 2 is a perspective view of the electrically powered slide rail.

As shown in FIG. 2, the electrically powered slide rail 1 includes a rail 11 extending in the fore and aft direction and a slider 12 slidably engaged by the rail 11. The extending direction of the rail 11 is defined as the fore and aft direction. The extending direction of the rail 11 may or may not coincide with the fore and aft direction of the vehicle. In other words, the extending direction of the rail 11 in this embodiment does not limit the extending direction thereof as mounted on the vehicle. In the present embodiment, the extending direction of the rail 11 coincides with the fore and aft direction of the vehicle. In this embodiment, the slider 12 is provided above the rail 11. Therefore, the rail 11 may be referred to as a lower rail and the slider 12 as an upper rail.

Figure 3:
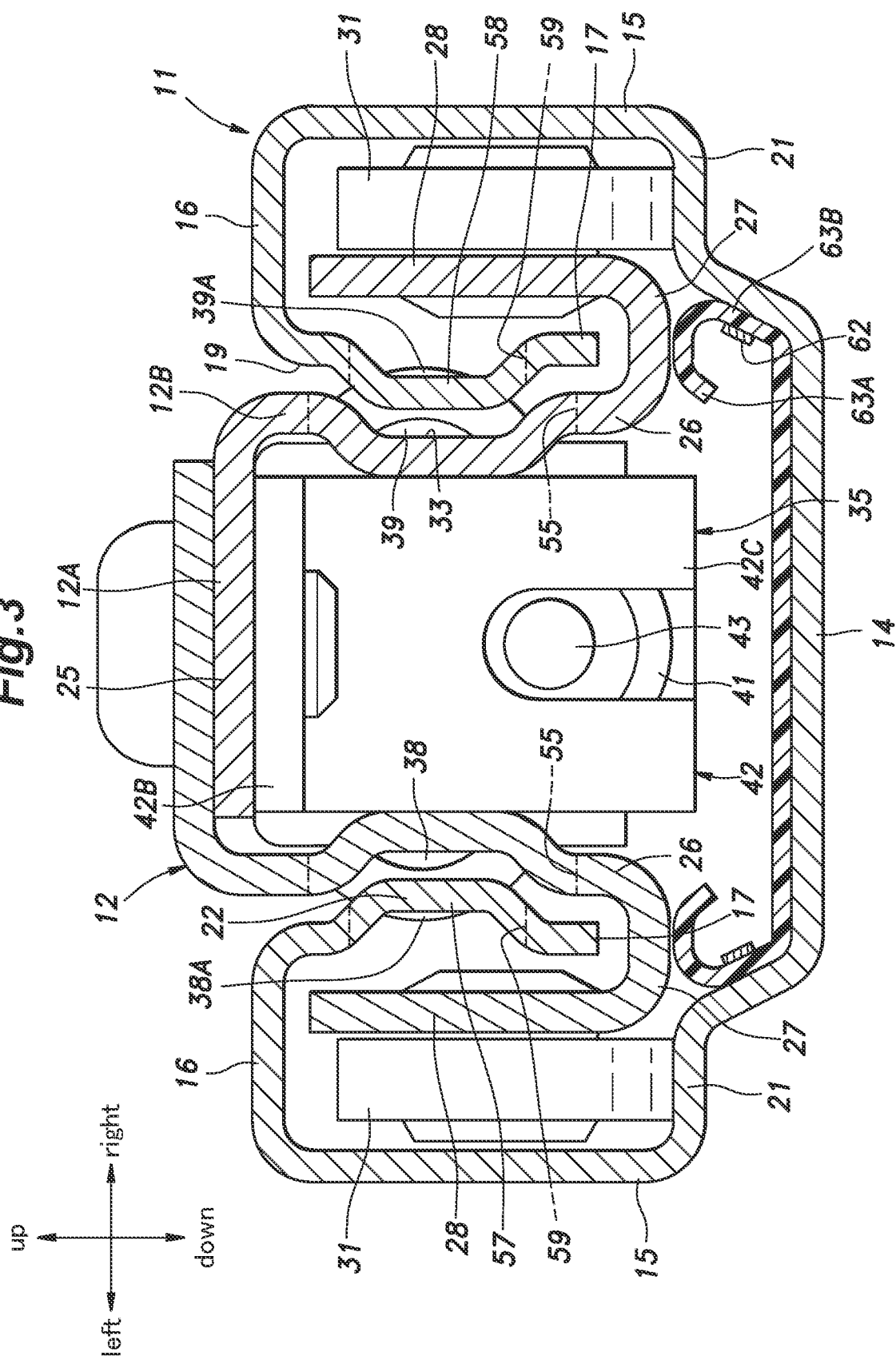
FIG. 3 is a sectional view of the electrically powered slide rail (taken along line III-III in FIG. 5)
Figure 4:
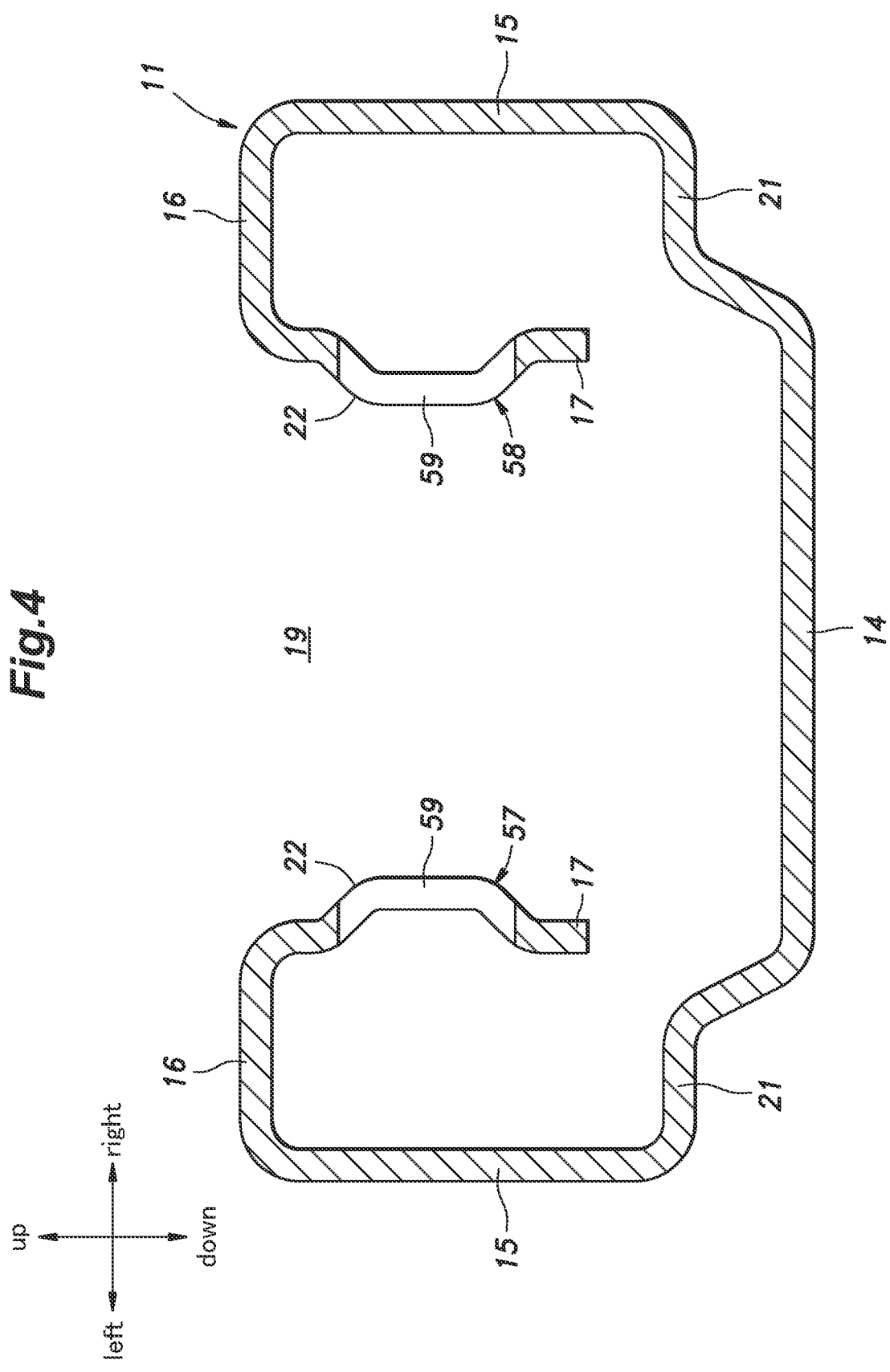
FIG. 4 is a sectional view of a rail.

As shown in FIGS. 3 and 4, the rail 11 has a channel-shaped cross section. More specifically, the rail 11 includes a rail bottom wall 14 having vertically facing surfaces, left and right rail outer side walls 15 which extend upward from the left and right edges of the rail bottom wall 14, respectively, and have laterally facing surfaces, a left and right rail upper walls 16 extending from the upper edges of the left and right outer side walls 15, respectively, toward each other and having vertically facing surfaces, and left and right inner side walls 17 extending downward from the inner edges of the respective left and right rail upper walls 16, respectively.

The left and right rail inner side walls 17 correspond to the first side wall and the second side wall of the claims, respectively.

The rail bottom wall 14, the left and right rail outer side walls 15, the left and right rail upper walls 16, and the left and right rail inner side walls 17 all extend in the fore and aft direction. The left and right rail outer side walls 15 extend parallel to each other and perpendicular to the rail bottom wall 14 and so do the left and right rail inner side walls 17. The lower ends of the left and right rail inner side wall walls 17 are spaced from the rail bottom wall 14. The rail 11 thus defines a rail opening 19 extending in the fore and aft direction at the upper end of the rail 11. The rail opening 19 is defined by the left and right rail inner side walls 17. The rail 11 may be formed by press forming a metal plate. The lateral edges of the rail bottom wall 14 may have stepped portions 21 that are raised upward. The left and night step portions 21 extend in the fore and aft direction, and have upper surfaces that are formed flat.

The rail inner side walls 17 are formed with protrusion 22 that project toward each other and extend in a fore and aft direction. The cross sections of the left and right protrusions 22 may be formed in an arcuate shape or a trapezoidal shape. Each protrusion 22 may be arranged at a vertically intermediate part of the corresponding rail inner side wall 17. The upper end portions and the lower end portions of the left and right rail inner side walls 17 are arranged on the laterally outer sides of the corresponding protrusions 22.

As shown in FIG. 3, the slider 12 includes a plate-shaped base portion 25 having vertically facing surfaces and positioned at the open end of the rail opening 19, left and right slider inner side walls 26 extending toward the rail bottom wall 14 or downward from the respective lateral side edges of the base portion 25, left and right slider lower walls 27 extending outward from the lower ends of the respective slider inner side walls 26, and left and right slider outer side walls 28 extending upward from the outer ends of the respective slider lower walls 27. The left and right slider inner side walls 26 correspond to the third side wall and the fourth side wall of the claims, respectively. The base portion 25, the left and right slider inner side walls 26, the left and right slider lower walls 27, and the left and right slider outer side walls 28 all extend in the fore and aft direction.

The slider 12 may be formed by fastening a plurality of press-formed or roll-formed metal plates to each other. In the present embodiment, the slider 12 consists of a first piece 12A providing the base portion 25, the left slider inner side wall 26, the left slider lower wall 27, and the left slider outer side wall 28, and a second piece 12B providing the base portion 25, the right slider inner side wall 26, the right slider lower wall 27, and the right slider outer side wall 28. The slider 12 is formed by overlapping the first piece 12A and the second piece 12B with each other at the respective base portions 25 thereof, and fastening them together. In another embodiment, the slider 12 is formed from a single-piece press-formed or roll-formed metal plate. The fore and aft length of the slider 12 is set shorter than the fore and aft length of the rail 11. The slider 12 is connected to the seat cushion 5 at the base portion 25 thereof.

The base portion 25 may be positioned either above the left and right rail upper walls 16, or below the left and right rail upper walls 16. The left and right slider inner side walls 26 laterally face each other and are spaced from each other by a certain distance. The left and right slider inner side walls 26 are positioned between the left and right rail inner side walls 17. Each slider inner side wall 26 laterally oppose the corresponding rail inner side wall 17 with a certain gap defined therebetween. Each slider lower wall 27 extends laterally through a space defined between the rail bottom wall 14 and the lower end of the corresponding rail inner side wall 17. Each slider outer side wall 28 is positioned laterally between the rail outer side wall 15 and the rail inner side wall 17 on the corresponding side. A plurality of rollers 31 are rotatably supported on the laterally outer side of each slider outer side wall 28. Each roller 31 has a laterally extending rotational axis, and is in contact with the rail bottom wall 14. In the present embodiment, each roller 31 is in rolling contact with the upper surface of the step portion 21 of the rail bottom wall 14. The slider 12 can slidably and smoothly move along the rail 11 by contacting the rail 11 via the rollers 31. Owing to this arrangement, the slider 12 is received by the rail 11 and slidably engages with the rail 11. In another embodiment, the slider 12 is supported by the rail 11 via a ball bearing or a roller bearing.

The left and right slider inner side walls 26 are respectively formed with recessed parts 33 that are recessed toward each other, and extend in the fore and aft direction so that a corresponding protrusion is formed on the back side the recessed part 33 of each slider inner side wall 26. The cross section of the left and right recesses 33 when viewed in the fore and aft direction is preferably formed in an arcuate shape or a trapezoidal shape. Each recessed part 33 may be positioned at a vertically intermediate part of the corresponding slider inner side wall 26. Each recessed part 33 is positioned so as to laterally oppose the corresponding protrusion 22 of the rail 11.

Figure 5:
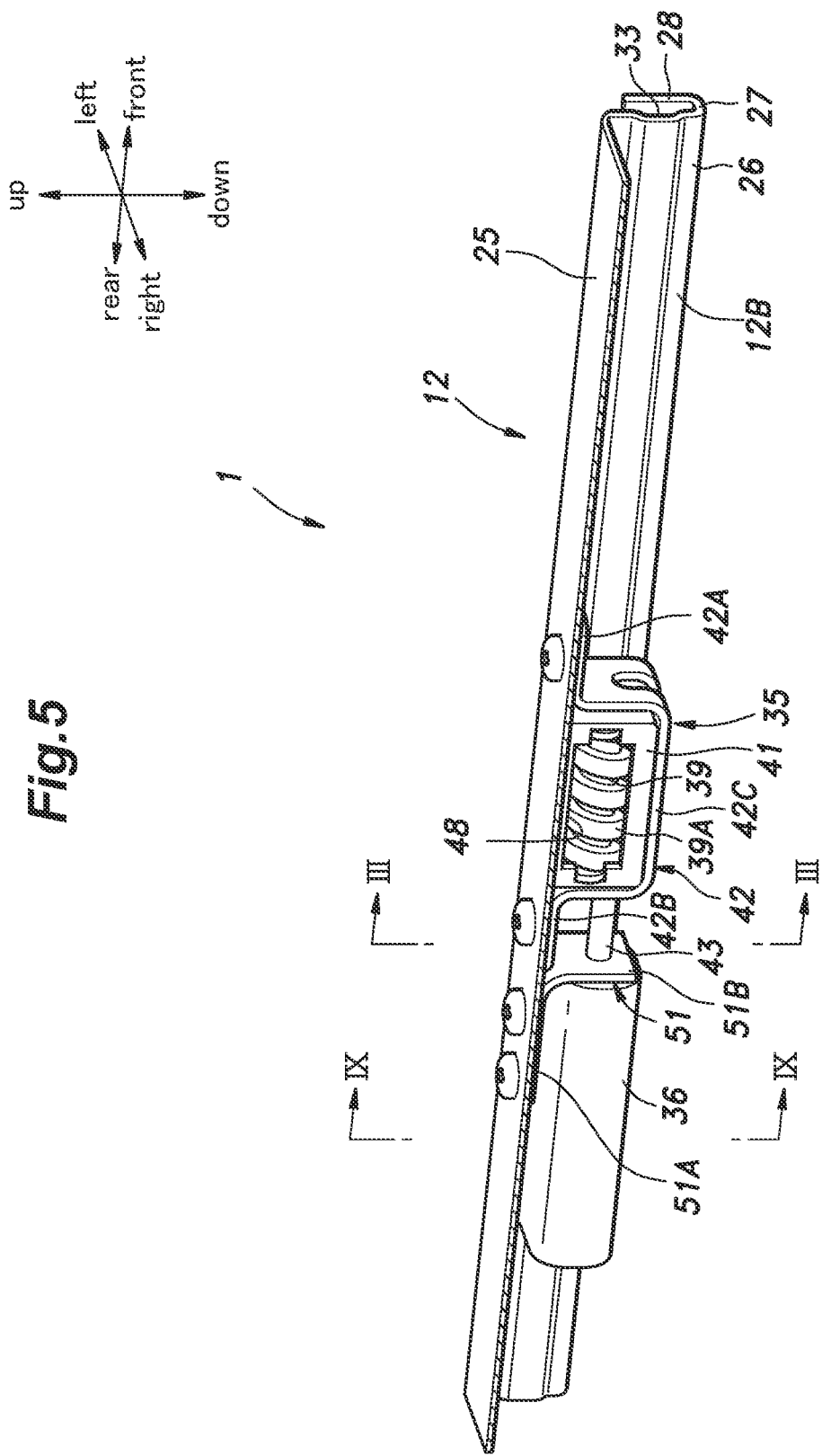
FIG. 5 is a perspective view of a slider partly in section.
Figure 6:
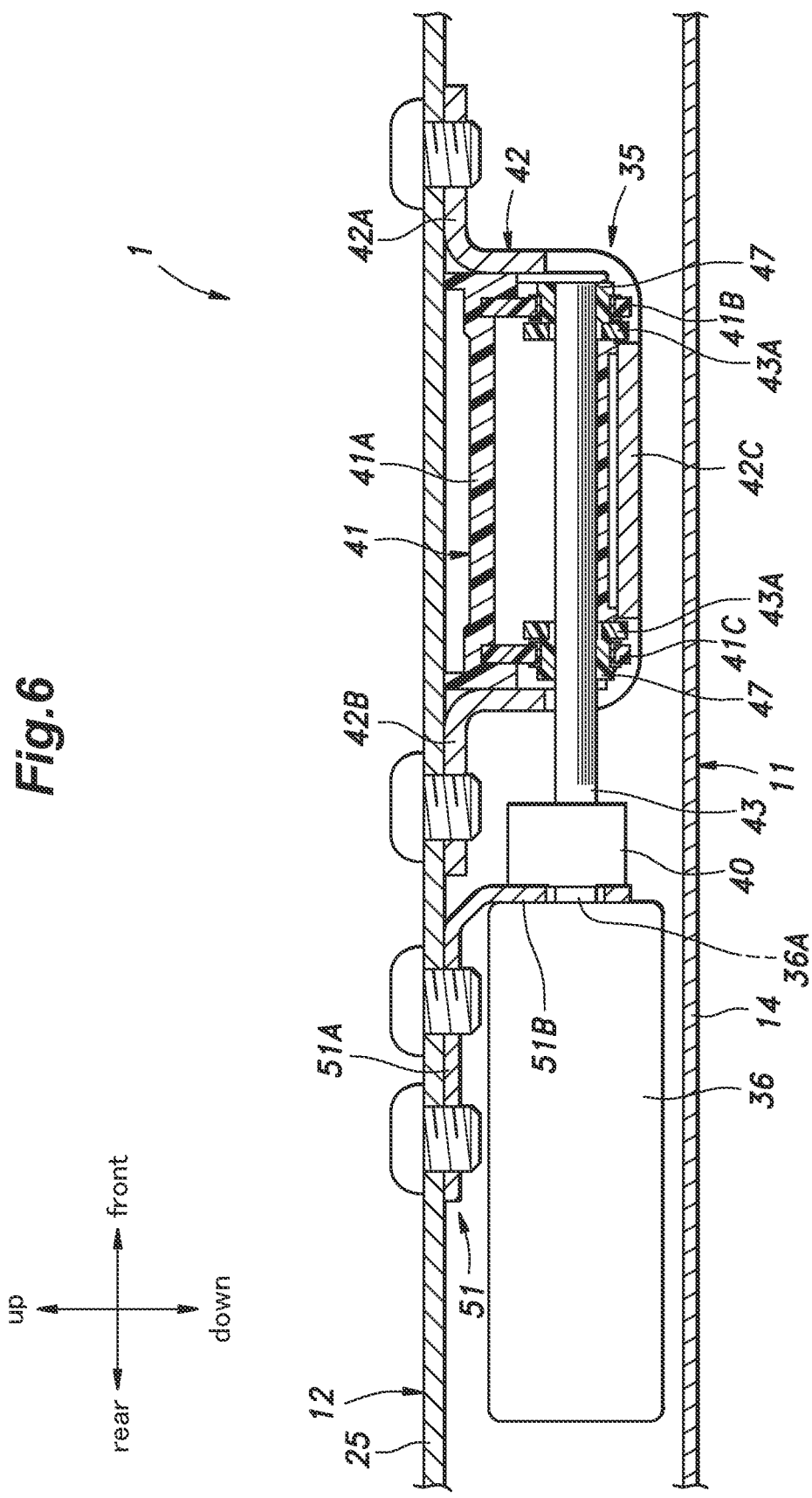
FIG. 6 is a sectional view of the electrically powered slide rail.

The slider 12 is formed by the base portion 25 and the left and right slider inner side walls 26 in a channel shape that opens toward the rail bottom wall 14, or in other words downward. As shown in FIGS. 5 and 6, a screw assembly 35 and an electric motor 36 are supported on the lower surface of the base portion 25. The screw assembly 35 includes screw members 38, 39 rotatably supported by the slider 12 around a rotational axis extending in the fore and aft direction. The electric motor 36 is supported by the slider 12 and rotates the screw members 38 and 39.

As shown in FIGS. 8 and 10, in the present embodiment, the screw members 38 and 39 include a first screw member 38 and a second screw member 39. In another embodiment, the thread assembly 35 includes a single threaded member. The first screw member 38 and the second screw member 39 are each provided with a screw thread 38A, 39A on the outer peripheral surface of an intermediate part thereof with respect to the longitudinal direction. The number of threads 38A and 39A (pitch) may be determined by the size of the electrically powered slide rail 1 and the required strength in the longitudinal direction of the electrically powered slide rail 1. For example, when it is desired to increase the required strength, it is preferable to increase the number of threads 38A and 39A. As shown in FIGS. 5 and 6, the screw assembly 35 includes a gear case 41 that rotatably supports the first screw member 38 and the second screw member 39, and a first bracket 42 for supporting the gear case 41 on the slider 12.

As shown in FIGS. 7 and 8, the gear case 41 is formed in the shape of a rectangular box elongated in the fore and aft direction. The gear case 41 rotatably supports the first screw member 38, the second screw member 39, and a drive shaft 43 connected to a rotary shaft 36A of the electric motor 36. The first screw member 38, the second screw member 39, and the drive shaft 43 all extend in the fore and aft direction, and are arranged in parallel with each other in the gear case 41. The gear case 41 includes a box-shaped outer case 41A forming an outer shell, and a front support member 41B and a rear support member 41C supported by the front end and the rear end of the outer case 41A, respectively. The front support member 41B is provided with a first bearing portion 45 rotatably supporting the front end of the first screw member 38, a second bearing portion 46 rotatably supporting the front end of the second screw member 39, and a third bearing portion 47 rotatably supporting the drive shaft 43. The rear support member 41C is provided with a first bearing portion 45 rotatably supporting the rear end of the first screw member 38, a second bearing portion 46 rotatably supporting the rear end of the second screw member 39, and a third bearing portion 47 rotatably supporting the drive shaft 43.

The first screw member 38 extends along the left side of the gear case 41, and the second screw member 39 extends along the right side of the gear case 41. The drive shaft 43 is positioned under an intermediate region between the first screw member 38 and the second screw member 39. The drive shaft 43 has a drive gear 43A located in the gear case 41. The first screw member 38 has a first gear 38B that meshes with the drive gear 43A. The second screw member 39 has a second gear 39B that meshes with the drive gear 43A. The drive gear 43A, the first gear 38B, and the second gear 39B may each consist of a spur gear. When the drive shaft 43 rotates, the first screw member 38 and the second screw member 39 rotate in the same direction. The first gear 38B and the second gear 39B may be symmetrical to each other.

As shown in FIGS. 5 and 6, the gear case 41 has a pair of case openings 48 that expose first screw member 38 and the second screw member 39 on the respective sides. The thread 38A of the first screw member 38 passes through the case opening 48 formed on the left side of the gear case 41 and projects to the left. Similarly, the thread 39A of the second screw member 39 passes through the case opening 48 formed on the right side of the gear case 41 and projects to the right. The case openings 48 are formed in the outer case 41A.

The first bracket 42 extends in the fore and aft direction, and has a first connecting portion 42A provided at the front end thereof and a second connecting portion 42B provided at the rear end thereof. The first bracket 42 is connected to the lower surface of the base portion 25 of the slider 12 at the first connecting portion 42A and the second connecting portion 42B. The first bracket 42 has a support portion 42C extending from the first connecting portion 42A to the second connecting portion 42B. The first bracket 42 may be an integral metal member including the first connecting portion 42A, the second connecting portion 42B, and the support portion 42C. The support portion 42C includes a part located below the first connecting portion 42A and the second connecting portion 42B. The support portion 42C of the first bracket 42 forms a closed cross section structure in cooperation with the base portion 25. The gear case 41 is positioned between the base portion 25 of the slider 12 and the support portion 42C. The first bracket 42 is formed by bending a metal plate. The first connecting portion 42A extends forward from the front part of the gear case 41, and the second connecting portion 42B extends rearward from the rear part of the gear case 41. The first connecting portion 42A and the second connecting portion 42B may be fastened to the base portion 25 by using fastening members such as screws and rivets. The distance between the fastening points of the first connecting portion 42A and the second connecting portion 42B is set to be greater than the fore and aft length of the gear case 41.

Behind the first bracket 42 is located a second bracket 51 for supporting the electric motor 36 on the base portion 25 of the slider 12. The second bracket 51 has a connecting portion 51A to be connected to the base portion 25, and a supporting portion 51B extending from the base portion 25 away from the connecting portion 51A or in other words downward. The support portion 51B extends orthogonally to the connecting portion 51A so that the second bracket 51 is formed in an L shape. The electric motor 36 is connected to the support portion 51B at one end thereof. In the present embodiment, the electric motor 36 is positioned under the connecting portion 51A, and the second bracket 51 supports the end portion of the electric motor 36 on the side of the screw members 38 and 39 in the manner of a cantilever.

The rear end of the drive shaft 43 projects rearward from the rear support member 41C of the gear case 41, and extends rearward through a through hole formed in the first bracket 42. The rotary shaft 36A of the electric motor 36 is connected to the rear end of the drive shaft 43. The rotary shaft 36A and the drive shaft 43 may be connected to each other by a shaft coupling. Alternatively, the rotary shaft 36A and the drive shaft 43 may be connected to each other via a shape fit structure. The rotary shaft 36A of the electric motor 36 and the drive shaft 43 are arranged on the same straight line. The electric motor 36 is formed in a cylindrical shape and extends in the fore and aft direction.

A speed reduction unit 40 may be provided between the rotary shaft 36A of the electric motor 36 and the drive shaft 43. The speed reduction unit 40 may be, for example, a planetary gear mechanism. The speed reduction unit 40 may be provided on the surface of the support portion 51B of the second bracket 51 facing away from the electric motor 36. In another embodiment, the speed reduction unit 40 is supported by the rear end surface of the gear case 41. The speed reduction unit 40 is an optional element, and may be omitted.

The screw assembly 35, the electric motor 36, the first bracket 42, and the second bracket 51 are all positioned under the base portion 25 and between the left and right slider inner side walls 26. The left and right slider inner sidewalls 26 are each provided with a slider opening 55 that is located at a position corresponding to the screw assembly 35. The slider openings 55 are formed in the recessed parts 33 of the slider inner side walls 26, respectively. The left part of the thread 38A of the first screw member 38 passes through the case opening 48 on the left side of the gear case 41 and the slider opening 55 on the left slider inner side wall 26, and projects to the left of the left slider inner side wall 26 of the slider 12. Similarly, the right part of the thread 39A of the second screw member 39 passes through the case opening 48 on the right side of the gear case 41 and the slider opening 55 of the right slider inner side wall 26, and projects to the right of the right slider inner side wall 26.

As shown in FIGS. 2 and 10, the rail 11 is formed with screw engaging portions 57, 58 extending in the fore and aft direction and engaging with the screw members 38, 39, respectively. FIG. 10 shows only the rail inner side wall 17 of the rail 11. The screw engaging portions 57 and 58 include a first screw engaging portion 57 formed on the left rail inner side wall 17 and meshing with the thread 38A of the first screw member 38, and a second screw engaging portion 58 formed on the right rail inner side wall 17 and meshing with the thread 39A of the second thread member 39. The first screw engaging portion 57 and the second screw engaging portion 58 are formed on the protrusions 22 of the corresponding rail inner side walls 17. The first screw engaging portion 57 and the second screw engaging portion 58 each include a plurality of engaging holes 59 formed in the protrusion 22 at regular intervals along the fore and aft direction. The first screw member 38 meshes or threads with the engaging holes 59 of the first screw engaging portion 57 at the left part of the thread 38A of the first screw member 38, and rotates around a rotational axis extending in the fore and aft direction so as to move in the fore and aft direction relative to the first screw engaging portion 57. Similarly, the second screw member 39 meshes of threads with the engaging holes 59 of the second screw engaging portion 58 at the right part of the thread 39A of the second screw member 39, and rotates around a rotational axis extending in the fore and aft direction so as to move in the fore and aft direction relative to the second screw engaging portion 58.

The rotation of the electric motor 36 is transmitted to the first screw member 38 and the second screw member 39 via the rotary shaft 36A, the drive shaft 43, the drive gear 43A, the first gear 38B or the second gear 39B as the case may be. As a result, the first screw member 38 and the second screw member 39 rotate in the same direction. When the first screw member 38 and the second screw member 39 rotate, the first screw member 38 and the second screw member 39 move in the fore and aft direction with respect to the first screw engaging portion 57 and the second screw engaging portion 58 so that the slider 12 moves in the fore and aft direction with respect to the rail 11.

As shown in FIGS. 3 and 9, the electrically powered slide rail 1 has a power feeding device 61 for supplying electric power to the electric motor 36. The power feeding device 61 extends in the interior of the rail 11 in the fore and aft direction, and includes a pair of conductive strips 62 connected to a power source 68, an electric insulating sheet 63 provided between the rail 11 and the conductive strips 62, and a pair of conductive contact terminals 64 that are provided on the electric motor 36 and are in sliding contact with the corresponding conductive strips 62. In the present embodiment, the electric insulating sheet 63 is provided on the upper surface of the rail bottom wall 14, and the conductive strips 62 are provided on the upper surface of the electric insulating sheet 63. The conductive strips 62 are strip-shaped metal sheets which are provided as a pair, one on the left and the other on the right, and extend in the fore and aft direction. The left and right conductive strips 62 are arranged along the left and right side edges of the electrically insulating sheet 63 extending in the fore and aft direction, respectively.

The electrical insulating sheet 63 has an extension 63A bent inward and above the corresponding conductive strip 62 on each side edge thereof. Each extension 63A opposes the corresponding conductive strip 62 on the corresponding side with a gap defined therebetween. In other words, each extension 63A extends above the corresponding conductive strip 62 either on the left or right side. The extensions 63A prevent foreign matter from coming into contact with the conductive strips 62. The left and right side edges of the electrical insulating sheet 63 may each have an inclined portion 63B inclined upward toward the laterally outer side. The left and right conductive strips 62 may be provided on the upper surface of the inclined portions 63B. In this case, foreign matter is more effectively prevented from coming into contact with the conductive strips 62.

Each contact terminal 64 extends from the electric motor 36 into a space defined between the extension 63A and the conductive strip 62 on the corresponding side. The contact terminal 64 is urged toward the conductive strip 62 owing to the elasticity thereof. The contact terminals 64 may each consist of, a piece of electroconductive metal, for example.

In the present embodiment, the electric motor 36 has a left contact terminal 64 that slides overs the left conductive strip 62 and a right contact terminal 64 that slides over the right conductive strip 62. The electric motor 36 receives electric power from the power source 68 via the left and right conductive strips 62 and the left and right contact terminals 64. When the slider 12 moves in the fore and aft direction with respect to the rail 11, the left and right contact terminals 64 slide in the fore and aft direction with respect to the corresponding conductive strips 62, and the left and right contact terminals 64 maintain contact with the corresponding conductive strip 62 throughout this process.

The power feeding device 61 is connected to the power source 68 via a control unit 66. The control unit 66 is provided on the floor 3, for example. The control unit 66 is an electronic control unit, and is connected to the power source 68, the left and right conductive strips 62 of each electrically powered slide rail 1, and an operation switch 67. The operation switch 67 is provided with a button corresponding to forward movement and another button corresponding to backward movement. The control unit 66 adjusts the electric power supplied to the conductive strips 62 according to the signal received from the operation switch 67, and controls the rotational direction and the rotational angle of the electric motor 36. The operator can thus operate the electrically powered slide rail 1 by operating the operation switch 67 and move the vehicle seat 2 in the fore and aft direction with respect to the floor 3. In another embodiment, the electric motor 36 is controlled by a wireless signal from a wireless device, independent from the electric power supplied by the conductive strip 62.

Each rail 11 of the left and right electrically powered slide rails 1 is connected to the floor 3 of the vehicle via a bracket or directly. Each rail 11 may be received by a rail groove 4 formed on the floor 3. The upper surface of the rail upper wall 16 of the rail 11 may be positioned on the same plane as the upper surface of the floor 3. By positioning the rail 11 in the rail groove 4, the rail 11 is prevented from protruding from the floor 3. Each of the sliders 12 of the left and right electrically powered slide rails 1 is connected to the seat cushion 5. The sliders 12 of the left and right electrically powered slide rails 1 may be connected to each other by a connecting member.

In the electrically powered slide rail 1 according to the present embodiment, since the electric motor 36 and the screw assembly 35 are fixed to the slider 12, the first screw member 38 and the second screw member 39 are prevented from tilting relative to the first screw engaging portion 57 and the second screw engaging portion 58. Therefore, the first screw member 38 can thread with the first screw engaging portion 57 at an appropriate angle so that the rotation of the first screw member 38 can occur in a smooth manner. The same applies to the second screw member 39. Thus, the present invention provides an electrically powered slide rail 1 that can operate smoothly. Further, since the electric motor 36 is attached to the slider 12 which is received by the rail 11, the outer profile of the electrically powered slide rail 1 can be minimized in size. Further, since the electric motor 36 is placed inside the slider 12, the distance between the electric motor 36 and the screw assembly 35 can be minimized so that the length of the drive shaft 43 connecting the electric motor 36 to the screw assembly 35 is minimized. As a result, the bending of the drive shaft 43 is reduced so that the screw assembly 35 can rotate smoothly.

Since the screw assembly 35 is provided with two members, the first screw member 38 and the second screw member 39, the screw assembly 35 can be small in sized although both the first screw engaging portion 57 and the second screw engaging portion 58 are engaged. Further, since the direction of the reaction force received by the first screw member 38 from the first screw engaging portion 57 and the direction of the reaction force received by the second screw member 39 from the second screw engaging portion 58 are opposite from each other, the first screw member 38 and the first screw engaging portion 57 can be securely engaged with each other, and the second screw member 39 and the second screw engaging portion 58 can be securely engaged with each other.

Since the first screw member 38 and the second screw member 39 form the screw assembly 35 jointly with the gear case 41 and the first bracket 42, the screw assembly 35 can be easily assembled to the slider 12.

Another power feeding device 81, which is a modification of the power feeding device 61, is described in the following. The power feeding device 81 in the vehicle seat 2 allows the wire harness to be paid out according to the position of the slider 12 while suppressing unnecessary movement of the wire harness with respect to the floor 3. In a certain embodiment, the wire harness is used for power supply and communication. Further, the power feeding device 81 functions as a cover for closing the opening of the rail 11. As shown in FIGS. 11 to 13, the power feeding device 81 is provided with a power line 82 connected to the power source 68 via the control unit 66, a plurality of cover pieces 83 attached to the power line 82, and a storage case 84 that houses the power line 82 and the cover pieces 83. The power line 82 is a wire harness whose outer peripheral portion is covered with an electric insulating material. The storage case 84 is provided with a storage chamber 86 defined therein, an inlet hole 87 for communicating the storage chamber 86 with the exterior, and a fixing portion 88 positioned in the storage chamber 86 to fixedly secure an end of the power line 82.

As shown in FIG. 11, the storage case 84 is formed in a flat box shape. The inlet hole 87 of the storage case 84 is provided on a side of the storage case 84 and is connected to the front end or the rear end of the rail 11. In this embodiment, the inlet hole 87 is connected to the rear end of the rail 11. The inlet hole 87 is provided at a rear part of the left or right side edge of the storage case 84 and opens toward the front. As shown in FIG. 12, in the present embodiment, the fixing portion 88 is a through hole formed in the bottom wall of the storage case 84. The cover pieces 83 are not attached to the one end side of the power line 82, and the power line 82 is fixed by being inserted into the fixing portion 88. The power line 82 passes through the fixed portion 88, extends to the outside of the storage case 84, and is connected to the control unit 66.

The power line 82 passes through the fixed portion 88, the interior of the storage chamber 86, the inlet hole 87, and the rail 11 in this order, and is then connected to the electric motor 36. An electric connector connected to the electric motor 36 may be provided inside the slider 12, and the power line 82 may be connected to this electric connector. The cover pieces 83 are connected to the outer peripheral portion of the power line 82. As shown in FIG. 13, each cover piece 83 includes an upper plate 91 and a pair of support pieces 92 extending downward from the upper plate 91. The cover pieces 83 may be made of, for example, a resin. The support pieces 92 interpose the power line 82 therebetween. Preferably, a pair of first locking claw 93 project from the lower ends of the respective support pieces 92 toward each other. The power line 82 can be held between the support pieces 92 by the first locking claws 93 retaining the power line 82.

When one of the cover pieces 83 located in the rail 11 is considered, the left and right side edges of the upper plate 91 thereof are placed on the upper surfaces of the left and right rail upper walls 16, respectively, and the support pieces 92 are positioned between the left and right rail inner side walls 17. The lower ends of the support piece 92 are provided with second locking claws 94 projecting away from each other. The vertical position of the cover piece 83 with respect to the rail 11 is determined by the abutting of the second locking claws 94 against the corresponding rail inner side walls 17. In the present embodiment, the second locking claws 94 are in contact with the lower parts of the protrusions 22 of the corresponding rail inner side walls 17. In another embodiment, the second locking claws 94 abut against the lower edges of the corresponding rail inner side walls 17.

The upper plates 91 of the adjacent cover pieces 83 have portions that overlap each other when viewed in the vertical direction. The upper plates 91 of the adjacent cover pieces 83 are rotatably connected to each other via a pivot 96 extending vertically so as to be mutually rotatable to each other within a predetermined range. By fitting the cover pieces 83 capable of rotating relative to each other within a prescribed range on the power line 82, the deflection of the power line 82 is restricted to a predetermined range. One of the cover pieces 83 located on the side of the electric motor 36 is connected to the rear end of the slider 12. The cover pieces 83 cover the part of the rail opening 19 of the rail 11 located behind the slider 12. Further, the cover pieces 83 hide the power line 82.

As shown in FIG. 12, the interior of the storage case 84 is fitted with a guide wall 97 for guiding the moving direction of the cover pieces 83. In this embodiment, the guide wall 97 is curved in a semicircular shape in plan view. The guide wall 97 smoothly bends the cover piece 83 that is moving rearward in the storage chamber 86 by making a sliding contact with the side of the cover pieces 83, and guides the cover pieces 83 toward the front part of the storage chamber 86.

The upper edge of the inlet hole 87 of the storage case 84 is located above the upper surface of the rail 11. Further, a side part of the inlet hole 87 is provided with a guide slope (not shown in the drawings) for guiding the upper plates 91 of the cover pieces 83 in the inlet hole 87 onto the upper surface of the rail 11.

Figure 12A:
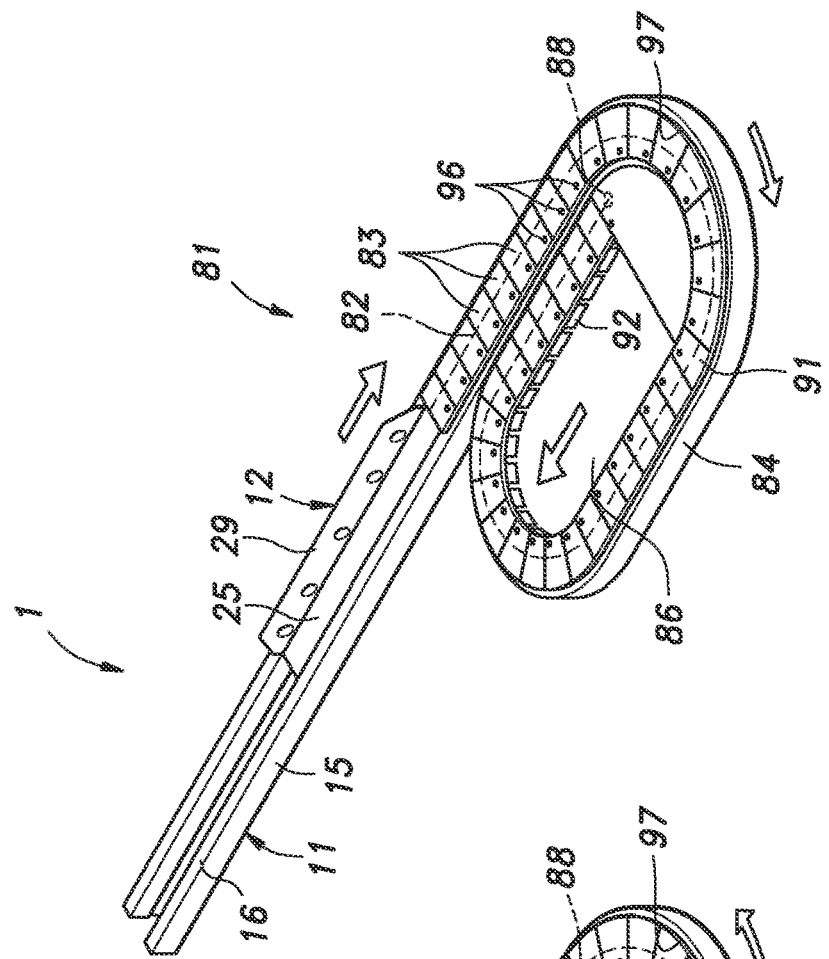
FIG. 12(A) is an explanatory view of the power feeding device when the slider is located in a front part of the rail.

As shown in FIG. 12A, when the slider 12 moves forward with respect to the rail 11, the power line 82 and the cover pieces 83 are pulled out forward from the inlet hole 87. At this time, the cover pieces 83 are guided by the guide slope with the upper plates 91 placed on the rail upper walls 16, and the second locking claws 94 located under the lower parts of the corresponding protrusions 22. As a result, the vertical position of the cover pieces 83 with respect to the rail 11 is positively determined. In this state, each cover piece 83 can slide in the fore and aft direction with respect to the rail 11.

Figure 12B:
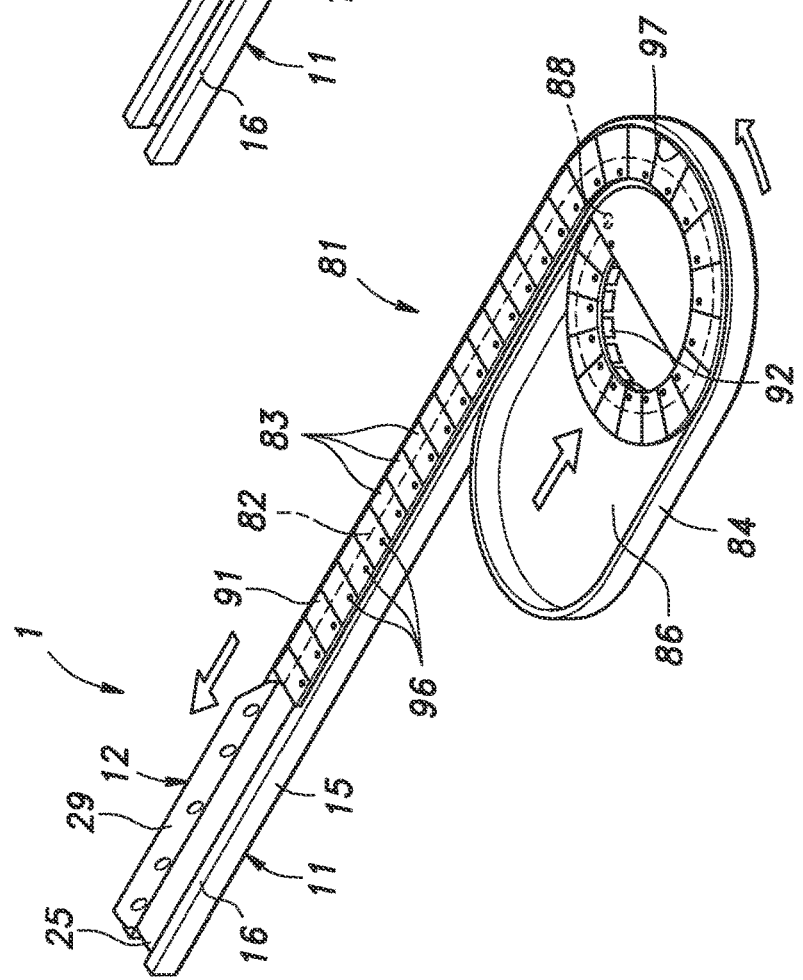
FIG. 12(B) is an explanatory view of the power feeding device when the slider is located in a rear part of the rail.

As shown in FIG. 12B, when the slider 12 moves rearward with respect to the rail 11, the cover pieces 83 are pushed rearward by the slider 12, pass through the inlet hole 87, and are pushed into the storage case 84. Once pushed into the storage case 84, the cover pieces 83 are guided by the guide wall 97 to the front part of the storage chamber 86.

The present invention has been described in terms of specific embodiments, but is not limited by such embodiments, and can be modified in various ways. For instance, the electrically powered slide rail 1 may be provided on an object so that the rail 11 extends in the lateral direction or the vertical direction. The shapes of the rail 11 and the slider 12 can be appropriately changed according to the purpose. In the foregoing embodiments, the present invention was applied to a seat for a vehicle, but the seat for a vehicle according to the present invention can also be applied to various other seats for aircraft, railways, and the like.

Further, the drive gear 43A may be provided both in the front and rear parts. In such case, the first gear 38B and the second gear 39B may be provided both in the front and rear parts so as to correspond to the two drive gears 43A.

In addition to or alternatively to the electric motor 36, the contact terminals 64 may be connected to other electrical devices provided on the vehicle seat 2 to supply electric power to such electrical devices.

Further, a plurality of sliders 12 may be provided on one rail 11 do that a plurality of seat cushions 5 may be individually arranged on one rail 11. In such a case, the conductive strips 62 may be provided so as to correspond to the different seats.

Figure 14:
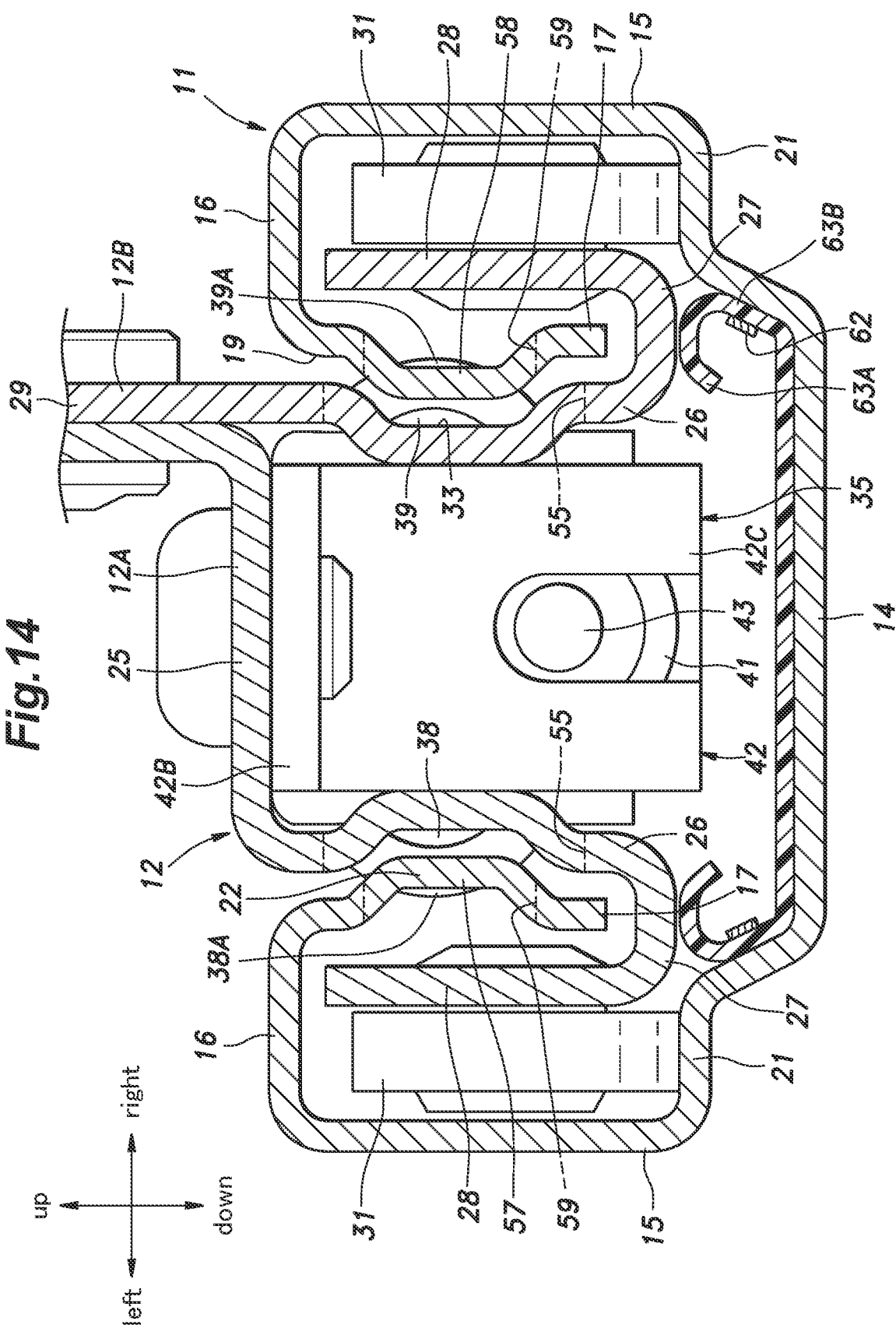
FIG. 14 is a sectional view of a slider according to another embodiment of the present invention.

As shown in FIG. 14, the slider 12 may have a connecting portion 29 projecting upward from the base portion 25. The connecting portion 29 is formed in a plate shape having laterally facing surfaces. The slider 12 may be connected to the seat cushion 5 at the connecting portion 29. In this case, the slider 12 is formed by a first piece 12A including the connecting portion 29, the base portion 25, the left slider inner side wall 26, the left slider lower wall 27, and the left slider outer side wall 28, and a second piece 12B including the connecting portion 29, the right slider inner side wall 26, the right slider lower wall 27, and the right slider outer side wall 28. Preferably, the first piece 12A and the second piece 12B jointly form the slider 12 by overlapping with each other and fastened to each other at the connecting portions 29.

LIST OF REFERENCE NUMERALS

| | |
|---|---|
| 1: electrically powered slide rail | 2: vehicle seat |
| 3: floor | 5: seat cushion |
| 11: rail | 12: slider |
| 17: rail inner side wall | 22: protrusion |
| 25: base portion | 26: slider inner side wall |
| 35: screw assembly | 36: electric motor |
| 36a: rotary shaft | 38: 1st screw member |
| 38A: thread | 38B: 1st gear |
| 39: 2nd screw member | 39A: thread |
| 39B: 2nd gear | 41: gear case |
| 42: 1st bracket | 42A: 1st connecting part |
| 42B: 2nd connecting part | 42C: support portion |
| 43: drive shaft | 43A: drive gear |
| 45: 1st bearing portion | 46: 2nd bearing portion |
| 47: 3rd bearing portion | 51: 2nd bracket |
| 51A: connecting portion | 51B: support portion |
| 57: 1st screw engagement portion | 58: second screw engagement portion |
| 59: engagement hole | 61: power source unit |
| 62: conductive strip | 63: electrical insulation plate |
| 63A: extension | 64: contact terminal |

The invention claimed is:

1. An electrically powered slide rail, comprising:
    a rail having a channel-shaped cross section and extending in a fore and aft direction;
    a slider received by the rail and slidably engaged by the rail;
    a screw member supported by the slider so as to be rotatable around an axial line; and
    an electric motor configured to rotate the screw member, wherein the rail is provided with a rail upper wall having vertically facing surfaces, a side wall extending downward from an edge of the rail upper wall, and a screw engaging portion formed in the side wall so as to engage the screw member, and
    a lower end of the screw member is positioned upward of a lower end of the electric motor.

2. The electrically powered slide rail according to claim 1, wherein the axial line of the screw member is positioned upward of the axial line of the electric motor.

3. The electrically powered slide rail according to claim 1, wherein the axial line of the screw member is offset laterally to the axial line of the electric motor.

4. The electrically powered slide rail according to claim 1, wherein the screw member is positioned in front of or behind the electric motor.

5. The electrically powered slide rail according to claim 1, wherein the screw member is supported to the slider by a first bracket and the electric motor is supported to the slider by a second bracket,
    the first bracket extends in the fore and aft direction, and has a first connecting portion provided at a front end thereof and a second connecting portion provided at a rear end thereof, and is connected to the slider at the first connecting portion and the second connecting portion,
    the second bracket has a third connecting portion to be connected to the slider, and
    a length from the front end of the first connecting portion to the rear end of the second connecting portion is longer than a length of the third connecting portion in the fore and aft direction.

6. The electrically powered slide rail according to claim 1, wherein an end of the electric motor on the side of the screw member is supported as a cantilever, and
    a length in the fore and aft direction between the end of the electric motor and the other end in the fore and aft direction of the electric motor is longer than a length of the screw member in the fore and aft direction.

7. The electrically powered slide rail according to claim 1, wherein the side wall includes a first side wall and a second side wall opposing each other
    the screw engaging portion includes a first screw engaging portion formed on the first side wall and a second screw engaging portion formed on the second side wall,
    the screw member includes a first screw member engaging the first screw engaging portion and a second screw member engaging the second screw engaging portion, and
    the first screw member and the second screw member are positioned above a lower end of the electric motor.

8. The electrically powered slide rail according to claim 7, wherein the axial line of the first screw member and the axial line of the second screw member respectively are positioned upward of the axial line of the electric motor.

9. The electrically powered slide rail according to claim 7, wherein the first screw member and the second screw member respectively are supported to the slider by a first bracket.

10. A method for making an electrically powered slide rail, comprising:
    preparing a rail having a channel-shaped cross section, the rail is provided with a rail upper wall having vertically facing surfaces, a side wall extending downward from an edge of the rail upper wall, and a screw engaging portion formed in the side wall;
    preparing a slider;

providing a screw member under the slider so as to be rotatable around an axial line;

providing an electric motor under the slider so as to be connected with the screw member; and assembling the slider to the rail slidably, wherein a lower end of the screw member is positioned above upward of a lower end of the electric motor.

11. The method for making an electrically powered slide rail according to claim 10, wherein the axial line of the screw member is positioned upward of the axial line of the electric motor.

12. The method for making an electrically powered slide rail according to claim 10, wherein the axial line of the screw member is offset laterally to the axial line of the electric motor.

13. The method for making an electrically powered slide rail according to claim 10, wherein the screw member is offset to positioned in front of or behind the electric motor.

14. The method for making an electrically powered slide rail according to claim 10, wherein the screw member is supported to the slider by a first bracket and the electric motor is supported to the slider by a second bracket, the first bracket extends in the fore and aft direction, and has a first connecting portion provided at a front end thereof and a second connecting portion provided at a rear end thereof, and is connected to the slider at the first connecting portion and the second connecting portion, the second bracket has a third connecting portion to be connected to the slider, and a length from the front end of the first connecting portion to the rear end of the second connecting portion is longer than a length of the third connecting portion in the fore and aft direction.

15. The method for making an electrically powered slide rail according to claim 10, wherein an end of the electric motor on the side of the screw member is supported as a cantilever, and a length in the fore and aft direction between the end of the electric motor and the other end in the fore and aft direction of the electric motor is longer than a length of the screw member in the fore and aft direction.

16. The method for making an electrically powered slide rail according to claim 10, wherein the side wall includes a first side wall and a second side wall, the screw engaging portion includes a first screw engaging portion formed in the first side wall and a second screw engaging portion formed in the second side wall, the screw member includes a first screw member engaging the first screw engaging portion and a second screw member engaging the second screw engaging portion, and the first screw member and the second screw member are positioned above a lower end of the electric motor.

17. The method for making an electrically powered slide rail according to claim 16, wherein the axial line of the first screw member and end the axial line of the second screw member respectively are positioned upward of the axial line of the electric motor.

18. The method for making an electrically powered slide rail according to claim 16, wherein the first screw member and the second screw member respectively are supported to the slider by a first bracket.

\* \* \* \* \*